US010516470B2

(12) United States Patent
Ma et al.

(10) Patent No.: US 10,516,470 B2
(45) Date of Patent: *Dec. 24, 2019

(54) METHOD FOR RELAYING SIGNALS VIA A FULL-DUPLEX, BI-DIRECTIONAL RELAY

(71) Applicant: Massachusetts Institute of Technology, Cambridge, MA (US)

(72) Inventors: Yunfei Ma, Santa Clara, CA (US); Nicholas Selby, Cambridge, MA (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,105

(22) Filed: Jul. 3, 2019

(65) Prior Publication Data
US 2019/0341994 A1 Nov. 7, 2019

Related U.S. Application Data

(63) Continuation of application No. 15/894,901, filed on Feb. 12, 2018, now Pat. No. 10,389,429.
(Continued)

(51) Int. Cl.
*H04B 7/145* (2006.01)
*G06K 19/067* (2006.01)
*H04B 7/155* (2006.01)

(52) U.S. Cl.
CPC .......... *H04B 7/145* (2013.01); *G06K 19/067* (2013.01); *H04B 7/15564* (2013.01)

(58) Field of Classification Search
CPC ... H04B 7/145; H04B 7/15564; G06K 19/067
See application file for complete search history.

(56) References Cited

U.S. PATENT DOCUMENTS 5,255,111 A * 10/1993 Kwa .................. H04L 5/1423
372/32
6,766,745 B1 * 7/2004 Kuklinski ............... B63G 7/00
102/402
(Continued)

FOREIGN PATENT DOCUMENTS

WO 2016096014 A1 6/2016

OTHER PUBLICATIONS

Angerer, C., et al., RFID Reader Receivers for Physical Layer Collision Recovery; published in IEEE Transactions on Communications (vol. 58, Issue: 12, Dec. 2010), IEEE publication date Oct. 28, 2010.
(Continued)

*Primary Examiner* — Brian E Miller
(74) *Attorney, Agent, or Firm* — Stephen R. Otis

(57) ABSTRACT

A method may comprise relaying a wireless signal via a bi-directional, full-duplex relay. The relay may comprise an analog uplink relay and an analog downlink relay, and may relay signals between a transmitter and a backscatter node. The spectrum of the downlink signal transmitted by the downlink relay may be different than the spectrum of the uplink signal received by the uplink relay. Filtering may attenuate leakage from the downlink relay to the uplink relay, and vice versa. The uplink relay may create a phase offset that is opposite in sign and substantially equal in magnitude to the phase offset created by the downlink relay. The downlink and uplink relays, taken together, may create a substantially constant net phase offset. The full-duplex relay may be housed in a vehicle that moves, and may be used to determine spatial coordinates of backscatter sources that are located in the relay's environment.

12 Claims, 15 Drawing Sheets

Related U.S. Application Data

(60) Provisional application No. 62/457,896, filed on Feb. 11, 2017.

(56) References Cited

U.S. PATENT DOCUMENTS

| | | | |
|---|---|---|---|
| 7,860,680 B2 | 12/2010 | Arms et al. | |
| 8,059,963 B2* | 11/2011 | Kim | H04B 10/25753 370/280 |
| 8,849,523 B1* | 9/2014 | Chan | G01S 13/89 701/50 |
| 9,344,264 B2* | 5/2016 | Babitch | H04L 5/1461 |
| 9,407,377 B2* | 8/2016 | Young | H04B 3/54 |
| 9,698,860 B2* | 7/2017 | Bharadia | H04L 5/1438 |
| 9,959,435 B1* | 5/2018 | Diorio | H04W 12/08 |
| 10,097,234 B2* | 10/2018 | He | H04B 1/525 |
| 2005/0163144 A1* | 7/2005 | Srikrishna | H04K 3/226 370/431 |
| 2005/0271006 A1* | 12/2005 | Chari | H04W 72/02 370/329 |
| 2008/0008126 A1* | 1/2008 | Shirakabe | H04B 7/2615 370/329 |
| 2009/0140852 A1* | 6/2009 | Stolarczyk | H01Q 1/04 340/539.13 |
| 2011/0300914 A1* | 12/2011 | Gudem | H04B 1/1027 455/574 |
| 2012/0062366 A1* | 3/2012 | Pappu | G06K 7/10009 340/10.1 |
| 2012/0263078 A1* | 10/2012 | Tung | H04B 7/15564 370/277 |
| 2013/0157713 A1* | 6/2013 | Stolarczyk | H04M 1/026 455/550.1 |
| 2013/0301487 A1* | 11/2013 | Khandani | H04W 16/14 370/278 |
| 2014/0219139 A1 | 8/2014 | Choi et al. | |
| 2015/0023225 A1* | 1/2015 | Li | H04B 1/525 370/277 |
| 2015/0318976 A1* | 11/2015 | Eltawil | H04B 1/123 370/278 |
| 2015/0333847 A1* | 11/2015 | Bharadia | H04B 15/00 455/63.1 |
| 2015/0341157 A1* | 11/2015 | Eltawil | H04L 5/1453 370/278 |
| 2016/0100415 A1* | 4/2016 | Mishra | H04L 5/14 370/277 |
| 2016/0127112 A1 | 5/2016 | Shalizi et al. | |
| 2016/0173164 A1* | 6/2016 | Kim | H04B 1/44 370/278 |
| 2016/0198459 A1* | 7/2016 | Noh | H04L 25/0202 370/329 |
| 2016/0234005 A1* | 8/2016 | Hong | H04B 15/00 |
| 2016/0247116 A1 | 8/2016 | Olivo et al. | |
| 2016/0380670 A1* | 12/2016 | Liu | H01P 1/213 455/73 |
| 2017/0005773 A1* | 1/2017 | Liu | H04B 1/525 |
| 2017/0023939 A1* | 1/2017 | Krouse | G05D 1/0022 |
| 2017/0085307 A1* | 3/2017 | Yazdani | H04B 7/18502 |
| 2017/0163404 A1* | 6/2017 | Liu | H04L 5/14 |
| 2017/0207532 A1* | 7/2017 | Wang | H01Q 1/48 |
| 2017/0302337 A1* | 10/2017 | Liu | H04B 7/005 |
| 2017/0353212 A1* | 12/2017 | Bharadia | H04B 1/525 |
| 2017/0374027 A1* | 12/2017 | Fischer | H04L 63/0428 |
| 2018/0070394 A1* | 3/2018 | Khandani | H04W 76/10 |
| 2018/0176067 A1* | 6/2018 | Luo | H04L 27/2678 |
| 2019/0222296 A1* | 7/2019 | Khandani | H04B 7/15557 |

OTHER PUBLICATIONS

Bharadia, D., et al., FastForward: fast and constructive full duplex relays; published in Proceedings of the 2014 ACM conference on SIGCOMM, pp. 199-210, Chicago, Illinois, USA, Aug. 17-22, 2014, ACM New York, NY, USA.

Dardari, D., et al., Enhanced localization coverage with non-regenerative UWB relays; published in 2012 Proceedings of the 20th European Signal Processing Conference (EUSIPCO), Aug. 2012.

Kumar, S., et al., Accurate indoor localization with zero start-up cost; published in MobiCom '14 Proceedings of the 20th annual international conference on Mobile computing and networking, pp. 483-494, Sep. 2014, ACM New York, NY, USA.

Longhi, M., et al., RFIDrone: Preliminary experiments and electromagnetic models; published in 2016 International Symposium on Electromagnetic Theory (EMTS), Aug. 2016.

Ma, Y., et al., 3D real-time indoor localization via broadband nonlinear backscatter in passive devices with centimeter precision; published in MobiCom '16 Proceedings of the 22nd Annual International Conference on Mobile Computing and Networking, pp. 216-229, Oct. 2016, ACM New York, NY, USA.

Parks, A., et al., Turbocharging ambient backscatter communication; published in SIGCOMM '14 Proceedings of the 2014 ACM conference on SIGCOMM, pp. 619-630, Aug. 2014, ACM New York, NY, USA.

Saleh, A., et al., Performance of Amplify-and-Forward and Decode-and-Forward Relays in LTE-Advanced; published in 2009 IEEE 70th Vehicular Technology Conference Fall (VTC 2009-Fall), Sep. 2009.

Swedberg, C., RFID-Reading Drone Tracks Structural Steel Products in Storage Yard; published in RFID Journal, Sep. 26, 2014.

Wang, J., et al., Dude, where's my card?: RFID positioning that works with multipath and non-line of sight; published in SIGCOMM '13 Proceedings of the ACM SIGCOMM 2013 conference on SIGCOMM, pp. 51-62, Aug. 2013, ACM New York, NY, USA.

Zhang, P., et al., HitchHike: Practical Backscatter Using Commodity WiFi; published in SenSys '16 Proceedings of the 14th ACM Conference on Embedded Network Sensor Systems, pp. 259-271, Nov. 2016, ACM New York, NY, USA.

* cited by examiner

METHOD FOR RELAYING SIGNALS VIA A FULL-DUPLEX, BI-DIRECTIONAL RELAY

RELATED APPLICATIONS

This application is a continuation of U.S. application Ser. No. 15/894,901, filed on Feb. 12, 2018, which claims the benefit of U.S. Provisional Application No. 62/457,896, filed Feb. 11, 2017.

STATEMENT REGARDING FEDERALLY SPONSORED RESEARCH OR DEVELOPMENT

This invention was made with government support under Grant No. CNS1739723 awarded by the National Science Foundation. The government has certain rights in the invention.

FIELD OF TECHNOLOGY

The present invention relates generally to analog relays.

BACKGROUND

Passive RFID (radio frequency identification) tags are often used to identify and track objects in factories, warehouses, or supply chains. Passive RFID tags may comprise battery-free devices which are attached to objects. When queried by a wireless device called a reader, RFID tags may respond with their unique IDs, enabling the reader to read and identify them from a distance.

In a conventional passive RFID system, a reader bootstraps communication by sending a query on a downlink channel. The query triggers the tag to power-up and communicate messages to the tag. A powered-up tag responds with its unique identifier through ON-OFF keying modulation. To do so, the tag switches its internal impedance between two states: reflective and non-reflective.

In a conventional RFID system, localization techniques determine the location of a tag based on the phase of the received tag response, which encodes distance information.

In the downlink channel, after transmitting a query, a conventional reader transmits a continuous wave x(t) at some frequency f, which may be expressed as:

$$x(t)=e^{j2\pi ft} \qquad \text{Eq. 1}$$

where t is time, and j is $\sqrt{-1}$.

In the uplink channel, a conventional passive RFID tag modulates the wave x(t) with some signal s(t). The modulated signal y(t) that is reflected from the tag and received at the reader may be expressed as $$y(t)=s(t)e^{j2\pi f(t-2d/c)} \qquad \text{Eq. 2}$$

where 2 d is the round-trip distance from the reader to the tag and c is the speed of light.

In a conventional RFID system, upon demodulation, a reader recovers the phase of the received signal as $\phi=4\pi d/c$ and use it for localization.

In a conventional RFID system, the communication range between the reader and the passive RFID tag is limited in the downlink channel. This is because, in a conventional system, the reader must be sufficiently close to power the passive RFID tag. In a conventional system: (a) the reader delivers power to the passive RFID tag (e.g., around −15 dBm for some passive UHF tags) so that the tag may power-up and decode. This limits the reliable range of conventional communication between a reader and passive tag to about 3-6 meters, because one cannot reliably power RFID tags at longer distances. The distance becomes much smaller if the RFID tag is buried under other objects, for example, under a stack of clothes in a retail store.

With conventional RFID systems, even if an entire store or warehouse were outfitted with a dense infrastructure of readers, 20-80% of the RFID tags may remain in blind spots due to destructive interference or orientation misalignment. Thus, in a conventional RFID system, to perform inventory control in a warehouse, an employee may walk around the warehouse carrying a reader (or maneuver a forklift, which carries a reader, around the warehouse) to scan for RFID tags throughout the entire warehouse, a process that may take up to a month.

SUMMARY

In illustrative implementations of this invention, an analog relay extends the communication range between a reader and a passive RFID tag. In some cases, the analog relay extends the communication range to more than ten times the range that is achievable by a conventional system with passive RFID tags. This is because, in illustrative implementations of this invention, the relay may communicate with both the reader and a passive tag while the relay is located: (a) at a long distance (e.g., 50 meters or more) from the reader, and (b) at a distance (e.g., 3-6 meters) from the tag that is sufficiently short that the relay may provide sufficient power to the tag.

In illustrative implementations, the analog relay is full-duplex and bi-directional. The relay may be full duplex because it both receives and transmits at the same time. The relay may be bi-directional because it operates both a downlink channel (relaying signals from the reader to the tag) and an uplink channel (relaying signals from the tag to the reader) at the same time. Thus, the full-duplex, bi-directional analog reader may simultaneously: (a) in the downlink channel, receive a signal from a reader and transmit a signal to the tag; and (b) in the uplink channel, receive a signal from the tag and transmit a signal to the reader.

In illustrative implementations, the analog relay preserves phase of the relayed signal. This preservation of phase is achieved even though: (a) the individual effect of the downlink channel of the relay may be to substantially alter phase and frequency; and (b) the individual effect of the uplink channel of the relay may be to substantially alter phase and frequency.

In some implementations, the analog relay preserves phase by creating a constant net phase offset in a roundtrip RF communication, which may net phase offset is eliminated by using a drone-embedded RFID tag, as described below.

In some implementations, the net phase offset created by the analog relay in a roundtrip RF communication is substantially constant, for any specific combination of phase and frequency of RF signal emitted by the RF source (e.g., by an RFID reader or by a radar source).

In illustrative implementations, the net phase offset caused by the analog relay may be eliminated, for practical purposes, by employing an RFID tag that is embedded with the relay. For example, in some cases (a) an RFID tag is embedded with the relay; (b) a first signal (from a tag that is remote—e.g., 3-6 meters—from the relay) is measured by the reader; (c) a second signal (from the embedded tag) is measured by the reader; (d) the measured first signal (from the remote tag) is divided by the measured second signal (from the embedded tag); (e) the signal that results from this division ("post-division signal") is attributable solely to the relay-tag half-link (except for a multiplicative constant that does not affect the result of a localization algorithm), and (f) thus the net phase offset created by the relay is effectively eliminated. This division operation may be performed by digital computation or by analog hardware.

In some implementations, in the post-division signal, the net phase offset attributable to the full-duplex analog relay is very small and varies only very slightly (after. For example, in some cases, the full-duplex analog relay is configured in such a way that, if 50 trials were run: (a) the expected value (in the statistical sense) of the magnitude of the net phase offset attributable to the relay in the post-division signal would be less than or equal to 1.5 degrees; and (b) the 99th percentile of the CDF of this magnitude of phase offset would be less than 5 degrees. For purposes of preceding sentence, "50 trials" means 50 trials in which: (a) the phase of the RF signal emitted by the RF source (e.g., reader) is constant within a single trial but varies randomly from trial to trial; and (b) in each trial, the relay relays a roundtrip RF communication. For purposes of the first sentence of this paragraph, the magnitude of the net phase offset is lowest at the 0th percentile of the CDF and greatest at the 100th percentile of the CDF. As used herein, "CDF" means cumulative distribution function.

In illustrative implementations, the analog relay preserves timing of the signal, in the sense that the relay may cause a substantially constant timing offset, due to latency in the hardware. For example, in some implementations, the net timing offset produced by the analog relay in a roundtrip RF communication is substantially constant, for any specific frequency of RF signal emitted by the RF source (e.g., by an RFID reader or by a radar transmitter). This substantially constant net timing offset created the analog relay may be sufficiently small (e.g., less than 100 nanoseconds) that the offset may be ignored for purposes of data communication. (In contrast, a conventional digital relay would "destroy" timing of the relayed signal by introducing arbitrary changes in timing of the signal).

In many cases, the ability of the analog relay to preserve phase and timing has practical advantages. For example, this ability is highly desirable in implementations in which the spatial coordinates of passive RFID tags are determined based on the phase of reflected signals from the tags.

In illustrative implementations, the analog relay includes a downlink channel and an uplink channel. The downlink channel in the analog relay may include: (a) a downlink receiver that receives a signal from a reader; and (b) a downlink transmitter that transmits a signal to one or more tags. The uplink channel in the analog relay may include: (a) an uplink receiver that receives a signal from a tag; and (b) an uplink transmitter that transmits a signal to the reader.

A challenge that confronts any relay is self-interference. There may be two types of self-interference in a relay: (1) inter-link self-interference and intra-link self-interference. The inter-link self-interference may be between the downlink channel and the uplink channel of the relay (e.g. a signal from the downlink transmitter feeding into the uplink receiver, or a signal from the uplink transmitter feeding into the downlink receiver). The intra-link self-interference may be within a given channel (e.g., within the downlink channel, or within the uplink channel). For example, intra-link self-interference may occur: (a) when a signal from the downlink transmitter feeds into the downlink receiver; or (b) when a signal from the uplink transmitter feeds into the uplink receiver.

Conventional solutions to self-interference in an analog relay tend to be bulky and heavy. For example, in some conventional analog relays, a heavy RF occluder (e.g., a wall) is placed between the downlink and uplink channels to reduce self-interference. In other conventional analog relays, the downlink and uplink channels are separated by a large physical distance, to reduce self-interference.

In contrast, in illustrative implementations of this invention, self-interference is greatly reduced, while keeping the analog relay lightweight and compact. Keeping the relay lightweight and compact is highly desirable in many practical scenarios. For example, a lightweight, compact relay may be carried by a small drone which is safe for flying in an indoor environment, such as a warehouse or factory. In contrast, a larger drone, which may be needed to carry a heavier conventional relay, may be unsafe for indoor use because a large drone might injure a person.

In some implementations, intra-link self-interference is greatly reduced by what may be loosely described as "frequency division", in which the reader-relay half-link operates at a first frequency and the relay-tag half-link operates at a second, different frequency.

First, let us consider the downlink channel in this "frequency division". The downlink receiver in the analog relay may lock on a first frequency (i.e., the frequency of the signal transmitted by the reader), and the downlink transmitter may transmit at a second frequency. This may greatly increase isolation between the downlink receiver and downlink transmitter, because the downlink receiver is locked on the signal from the reader, which has a different frequency than the signal transmitted by the downlink transmitter. Thus, intra-link self-interference in the downlink channel of the relay may be greatly reduced.

Next, let us consider the uplink channel in this "frequency division". The uplink receiver in the analog relay may lock on the second frequency (i.e., the frequency of the signal transmitted by the downlink transmitter and of the signal reflected by the tag), and the uplink transmitter may transmit at the first frequency (i.e., the frequency of the signal transmitted by the reader). This may greatly increase isolation between the uplink receiver and uplink transmitter, because the uplink receiver may be locked on the signal from the tag, which has a different frequency than the signal transmitted by the uplink transmitter. Thus, intra-link self-interference in the uplink channel of the relay may be greatly reduced.

In some implementations, the analog relay preserves phase—even though frequency (and thus phase) is altered in the downlink and uplink channels of the relay to reduce intra-link self-interference, as described above. As noted above, in some cases, this preservation of phase is achieved as follows: (a) a frequency offset and phase offset are created by the downlink channel of the analog relay; and (b) compensating frequency and phase offsets are created by the uplink channel of the relay, which are equal (in magnitude) and opposite (in sign) to those created in the downlink channel. For example, if frequency offset x and phase offset y are created in the downlink channel, then a compensating frequency offset −x and phase offset −y may be created by the uplink channel.

In some cases, the compensating frequency and phase offsets are achieved by mixers (in the analog relay) that share a common oscillator. For example: (a) an oscillator may control phase and frequency of a signal; and (b) that signal may feed into a mixer in the relay's downlink channel and the multiplicative inverse of that signal may feed into a mixer in the relay's uplink channel; thereby causing the former mixer to produce phase and frequency offsets, and causing the latter mixer to produce equal (in magnitude) and opposite (in sign) phase and frequency offsets. Thus, in some cases, phase and frequency offsets created by a mixer in the relay's downlink channel are effectively canceled by a mixer in the relay's uplink channel, where the two mixers share a common oscillator.

For example, in some cases: (a) in the downlink channel of the relay, a first mixer downconverts an RF signal to baseband and a second mixer upconverts to RF; (b) in the uplink channel of the relay, a third mixer downconverts an RF signal to baseband and a fourth mixer upconverts to RF; (c) a first synthesizer outputs a first signal; (d) the first synthesizer includes a first oscillator that controls the phase and frequency of the first signal; (e) the first signal and the multiplicative inverse of the first signal are fed into the first and fourth mixers, respectively; (f) when the first mixer downconverts in the downlink channel, the first mixer creates frequency offset $x_1$ and phase offset $y_1$; (g) when the fourth mixer upconverts in the uplink channel, the fourth mixer creates frequency offset $-x_1$ and phase offset $-y_1$, which exactly compensate for the offsets created by the first mixer; (h) a second synthesizer outputs a second signal; (i) the second synthesizer includes a second oscillator that controls the phase and timing of the second signal; (j) the second signal and the multiplicative inverse of the second signal are fed into the second and third mixers, respectively; (k) when the second mixer upconverts in the downlink channel, the second mixer creates frequency offset $x_2$ and phase offset $y_2$; and (l) when the third mixer downconverts in the uplink channel, the third mixer creates frequency offset $-x_2$ and phase offset $-y_2$, which exactly compensate for the offsets caused by the second mixer. Thus, in the example described in the preceding sentence, the first and fourth mixers share a common oscillator and the second and third mixers share a common oscillator. Alternatively, in that example, all four mixers may share a common oscillator.

In some implementations, inter-link self-interference is greatly reduced by exploiting the fact that the signals from reader and tag, respectively, occur in different frequency bands relative to their respective center frequencies. Specifically, the signal from the reader may occur in a narrow, center frequency band that includes and is centered on the center frequency of that signal (a "center band"). In contrast, the reflected signal from the tag may occur in two narrow frequency bands that are located on either side of, but are separated from, the center frequency of the reflected signal (two "bracket bands").

This difference in location of frequency bands (relative to center frequency) may be accentuated by low-pass filtering in baseband in the downlink channel and by band-pass filtering in baseband in the uplink channel. For example: (a) in the downlink channel, the downlink receiver may receive an RF signal (from the reader) which signal has its greatest power peak in a center band; (b) in the downlink channel, the RF signal may be downconverted to baseband, then low-pass filtered, then upconverted to RF; (c) in the uplink channel of the relay, the uplink receiver may receive a reflected RF signal (from the tag) which reflected signal has most of its power in two bracket bands; and (d) in the uplink channel, the RF signal may be downconverted to baseband, then band-pass filtered, then upconverted to RF. In the uplink channel, the band-pass filter may allow baseband frequencies that correspond to the two RF bracket bands of the reflected signal to pass but may block other baseband frequencies. As a result, after the band-pass filtered signal is upconverted to RF, the uplink transmitter may transmit an RF signal that has most of its power in two RF bracket bands on either side of the center frequency of the RF signal. Thus, even though the center frequency of the signal received by the downlink receiver (from the reader) may be the same as the center frequency of the signal transmitted by the uplink transmitter (to the reader), the downlink receiver may be, to a very large extent, isolated from uplink transmitter. This is because the downlink receiver may lock on the narrow center band transmitted by the reader, instead of the bracket bands transmitted by the uplink transmitter. Increasing the isolation between the uplink transmitter and downlink receiver reduces the inter-link self-interference between them.

(In some cases, the center frequency of the signal transmitted by the reader is unknown. In that case, the relay may gradually sweep the center frequency for downconversion in the downlink channel, to determine the center frequency at which the signal power from the reader is greatest.)

Likewise, in some cases: (a) the downlink transmitter transmits an RF signal in a narrow center band; and (b) a passive tag reflects a signal to the uplink receiver in two bracket bands. Thus, even though the center frequency of the signal transmitted by the downlink transmitter may be the same as the center frequency of the signal reflected from the tag, the downlink transmitter and uplink receiver may, to a very large extent, be isolated from each other. Increasing the isolation between the downlink transmitter and uplink receiver reduces the inter-link self-interference between them.

In illustrative implementations, reducing self-interference created by the relay has many practical advantages. Among other things, the more that this self-interference is reduced, the greater the reader-relay distance (distance between reader and relay) at which the relay may successfully relay signals to and from the reader.

In some implementations, the analog relay is housed in a vehicle such as a drone.

For example, the analog relay may be housed in a drone that flies in a flight path (such as an indoor flight path in a warehouse or factory). As the drone flies, the analog relay may continuously forward uplink and downlink traffic between one or more readers and a set of passive RFID tags.

In some implementations, when a reader transmits a query, a drone-mounted, analog relay detects the query, forwards it to a passive RFID tag, and then forwards the tag's reply back to the reader. As the drone flies, the relay may scan an entire warehouse, thereby extending the range of an already deployed RFID infrastructure.

In some implementations, a reader: (a) takes measurements of signals that reflect from a set of passive tags and are relayed via the relay to the reader; and (b) a computer decodes the signals to identify a unique ID for each of these tags. Furthermore, based on these measurements, a computer may localize each of these tags (i.e., calculate 2D or 3D spatial coordinates of the tag). Also, to identify an object to which an RFID tag is attached, a computer may access a local database that maps an RFID tag's unique ID to the object that the tag is attached to. For example, the local database may be provided by a manufacturer and may map a set of objects to a set of RFID tags, in such a way that each object is mapped to a unique identifier of a single RFID tag that is attached to the object.

In some implementations of this invention, an RFID system includes: (a) a vehicle, such as a drone; (b) a relay that is housed in the vehicle and that is analog, bi-directional, full-duplex, phase-preserving and timing-preserving; (c) one or more readers in fixed locations in the environment; (d) multiple passive RFID tags attached to objects in the environment (e.g., attached to products in a warehouse), and (e) one or more computers. In some implementations, the RFID system may determine the unique ID of each passive RFID tag in the system and localize each passive RFID tag in the system (i.e., determine the tag's 2D or 3D position). In some implementations, the RFID system may identify and localize a passive RFID tag that is separated by tens of meters from a reader (i.e., which is a much longer distance than the read range of a conventional reader). In some implementations, the RFID system may identify and localize a passive RFID tag, even if the tag is not in line-of-sight of the reader. In some implementations, this ability to work in non-line-of-sight environments enables the RFID system to localize occluded RFID-tagged objects in highly cluttered environments such as warehouses, stores, and factories.

In illustrative implementations, the position of an RFID tag is calculated based on phase attributable to the relay-tag half link, as discussed in more detail below. However, in illustrative implementations, the signal measured by the reader is attributable to two half-links of communication: (1) the tag-relay half-link; and (2) the relay-reader half-link. Thus, in some cases, two phases are entangled in the signal measured by the reader. Specifically, in some cases, the phase attributable to the tag-relay half-link is entangled with the phase attributable to the relay-reader half-link.

A problem that confronted the inventors, when attempting to calculate tag position based on phase, was how to extract—from a signal measured by the reader—the phase attributable to the relay-tag half link. In some implementations, this problem is solved as follows: A passive RFID tag may be embedded, together with the relay, in a vehicle (such as a drone). The reader may measure the signal from the embedded tag. A computer may computationally divide the signal from a tag in the environment (whose location is unknown) by the signal from the embedded tag. The resulting signal (i.e., the signal that results from this division) may be attributable solely (a) to the half-link between the relay and the tag in the environment and (b) to a multiplicative constant. Also, this resulting signal may be equal to the product of the relay-tag signal and a multiplicative constant. In illustrative implementations, the phase of this resulting signal may be attributable solely to the tag-relay half-link. The multiplicative constant may be a constant complex number. The multiplicative constant may be due to the fact that an RF amount of time The embedded tag may be separate from the analog relay, but housed in the same vehicle as the relay. For example, in some cases: (a) the tag is separate from the analog relay, but housed in the same vehicle as the relay; (b) the antenna for the embedded tag is different than the antenna(s) for the relay; (c) the relay is at a short, constant distance from the embedded tag; and (d) the multiplicative constant (that results from dividing by the signal from the embedded tag) is constant due to this short, constant distance (and the short, constant time that a RF signal takes to traverse this short, constant distance).

Alternatively, the embedded RFID tag may comprise part of a bi-modal circuit housed in the vehicle. In one mode, this bi-modal circuit may operate as an analog, bi-directional, full-duplex, phase-preserving, and timing-preserving relay. In another mode, this bi-modal circuit may operate as a passive RFID tag that receives the reader signal via the downlink receiver antenna, modulates the signal, and reflects the modulated signal via the same antenna. The bi-modal circuit may switch very rapidly between these two modes (e.g., switch mode at least once every x milliseconds, where 1≤x≤5). In some cases: (a) the embedded tag is part of this bi-modal circuit; (b) the antenna that is employed as the tag's antenna in the tag mode is also employed as an antenna in the relay mode; and (c) the multiplicative constant (that results from dividing by the signal from the embedded tag) is equal to one.

The signal that reflects from the embedded RFID tag may be relayed by the relay to the reader, or may travel directly from the embedded tag to the reader, or both.

Another problem that confronted the inventors, when attempting to calculate tag position based on phase, was multi-path reflections. That is: (a) radio waves traveling between the relay and tag may travel in multiple paths, in addition to the direct path between the relay and tag; and (b) radio waves traveling between the relay and reader may travel in multiple paths, in addition to the direct path between the relay and reader. For example, radio waves may bounce off walls or shelves. Furthermore, the signal from an indirect path may be stronger than the signal from the direct path (e.g., if the indirect reflection is from a metal shelf).

In some implementations, the inventors solved this multi-path problem as follows: In the localization algorithm, a computer may compute multiple possible locations for a tag, where each possible location corresponds to a peak power associated with a particular path. The computer may then select, out of this set of computed possible locations, the computed location of the tag that is closest to the known, then-current position of the relay. This approach works because: (a) the direct path between the tag and relay is shorter than any path that involves an indirect reflection (e.g., from a reflector such as a wall or furniture); and (b) likewise, the direct path between the relay and reader is shorter than any path that involves an indirect reflection. Thus, in some implementations: (a) "ghost" positions of the tag are detected due to one or more indirect reflections; and (b) at any given position of the relay (while the relay is moving in a path), the distance between the relay and each "ghost" position of the tag is always greater than the distance between the relay and the actual position of the tag. In illustrative some implementations, the then-current position of the relay is "known" because it is determined by a sensor system (e.g., by an optical navigation system or RF navigation signal which detects the position of the relay in real time).

In some implementations, a computer performs a localization algorithm that: (a) accepts measurements as an input, which measurements are taken by a reader and measure relayed signals, which relayed signals are from a passive RFID tag and are relayed by a relay while the relay moves to multiple positions in a path; (b) also accepts, as an input, 2D or 3D spatial coordinates of the relay, at each of the multiple positions; and (c) outputs 2D or 3D spatial coordinates of the passive RFID tag.

In some implementations, the localization algorithm leverages the fact that the phase attributable to the relay-tag half-link encodes the distance between the relay and tag. In some implementations, a relay in a vehicle travels in a trajectory (e.g., a drone-mounted relay may travel in a flight path). At a first known position in the trajectory, the analog relay may relay a signal from the tag to the reader, and the reader may measure this signal. The phase attributable to the tag-relay half-link may be extracted from this signal. The extracted phase may encode information about the distance between the relay and the tag, for that first known position of the trajectory. The localization algorithm may repeat this process for a set of multiple positions of the relay in the flight path, to determine the relay-tag distance at each of these multiple positions of the relay. Based on the relay-tag distance at these multiple positions of the tag, a computer may compute the position of the tag.

In some implementations: (a) the analog relay is housed in a vehicle (such as a drone); and (b) the vehicle includes an optical navigation system that allows the vehicle to determine its own position, navigate, and perform obstacle avoidance. For example, the optical navigation system: (a) may include one or more onboard cameras and one or more onboard computers; and (b) may recognize visual markers that are in fixed positions on the ground (or floor of a warehouse) or that in fixed, elevated positions, such as at the top of a set of shelves.

Alternatively, in some implementations: (a) the analog relay is housed in a vehicle (such as a drone); and (b) the vehicle employs an RF-based navigation system that determines the vehicle's position. For example, the RF-based navigation system may determine the position of the relay based on RFID signals from a set of RFID tags located at fixed, known positions in the environment (e.g., at fixed known locations in a warehouse).

Regardless of what type of navigation system is employed (e.g., an optical system or an RF-based system): (a) the navigation system may determine 2D or 3D spatial coordinates of the relay at multiple positions in a path (e.g., a path traversed by a vehicle which houses the relay); and (b) these spatial coordinates of the relay may be accepted, as input, by a localization algorithm that determines the (previously unknown) position of an RFID tag in the environment.

Thus, the navigation system may calculate the position of the relay (which is mounted in a vehicle that is traveling in a trajectory) at different points in the trajectory. For purposes of the localization algorithm, these positions may be "known" because they have been calculated by the navigation system.

In some implementations, a vehicle which houses the relay may travel in a pre-determined path. For example, a drone that houses a relay may fly in a pre-determined path. Or, for example, a vehicle may move along a rail or track in a pre-determined path. Moving in a pre-determined path may simplify navigational computations and tend to reduce collisions with obstacles.

This invention may be implemented in many different ways, in addition to or instead of the approaches described above.

For example, this invention is not limited to employing only one relay between a reader and a tag. In some cases, communication range is extended even further by employing a "daisy-chain" of multiple relays between a reader and a tag.

Furthermore, this invention is not limited to housing the relay in a mobile machine (such as a drone). In some cases, the analog relay is located at a fixed spatial position.

This invention is not limited to RFID signals, but may instead relay any type of RF (radio frequency) signal. For example, in some cases, the analog relay relays radar signals from a radar source to a backscattering object and then back again. In some cases, the analog relay relays RF signals from an RF source to a passive backscattering object (such as a human body) and then back again.

In some cases, the relay communicates with multiple readers.

In some cases, the relay (e.g., a relay housed in a drone) moves in a 2D path (e.g., a flight path at a constant elevation) while measurements are taken to localize a tag. In other cases, the relay (e.g., a relay housed in a drone) moves in a 3D path (e.g., a flight path at varying elevations) while measurements are taken to localize a tag.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the description of this invention in the Field of Technology section is not limiting; instead it identifies, in a general, non-exclusive manner, a field of technology to which some implementations of this invention generally relate.

The above Figures show some illustrative implementations of this invention, or provide information that relates to those implementations. The examples shown in the above Figures do not limit this invention. This invention may be implemented in many other ways.

DETAILED DESCRIPTION

Mobile Relay, Generally

Figure 1:
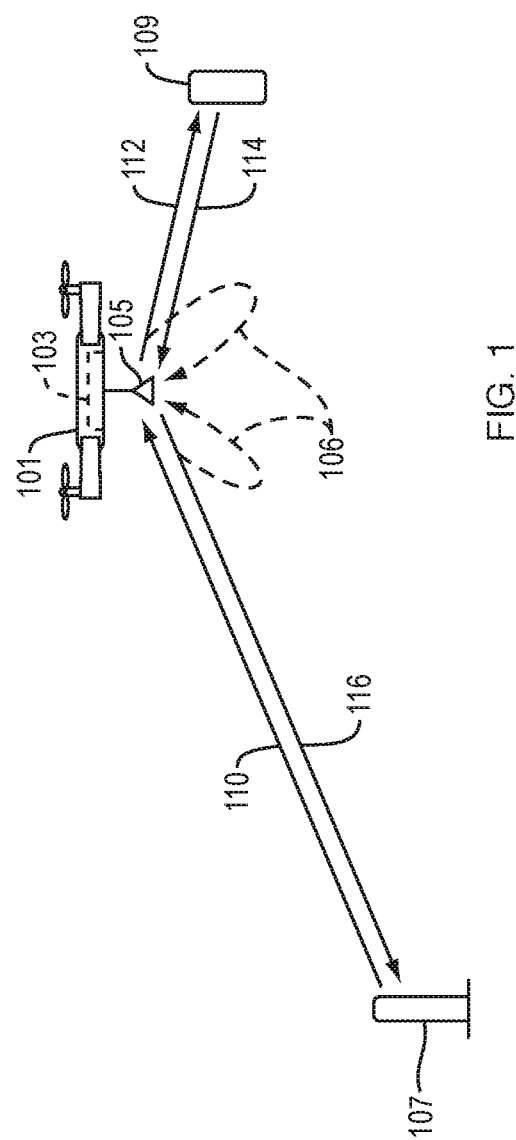
FIG. 1 is a diagram of a mobile relay and its communication links.

FIG. 1 is a diagram of a mobile relay and its communication links. In the example shown in FIG. 1, a drone 101 houses a relay 103. Relay 103 includes a downlink circuit, uplink circuit and one or more antennas, including antenna 105. The packets forwarded by relay 103 on the uplink and downlink may feed back into its antenna(s), causing self-interference 106. In illustrative implementations of this invention, self-interference is greatly reduced, as discussed in more detail below.

In FIG. 1, downlink communications include RF signals 110 (sent by reader 107 to relay 103) and also include RF signals 112 (sent by relay 103 to tag 109). In FIG. 1, uplink communications include RF signals 114 (sent by tag 109 to relay 103) and also include RF signals 116 (sent by relay 103 to reader 107). For example: (a) in the downlink channel, the relay may relay (to the tag) a query from the reader; and (b) in the uplink channel, the relay may relay (to the reader) a signal that reflects from the tag.

In FIG. 1: (a) a reader-relay half-link comprises a communication link between the reader and relay (e.g., signals 110 and 116 are in this half-link); and (b) a tag-relay half-link comprises a communication link between the tag and relay (e.g., signals 112 and 114 are in this half-link).

Figure 2:
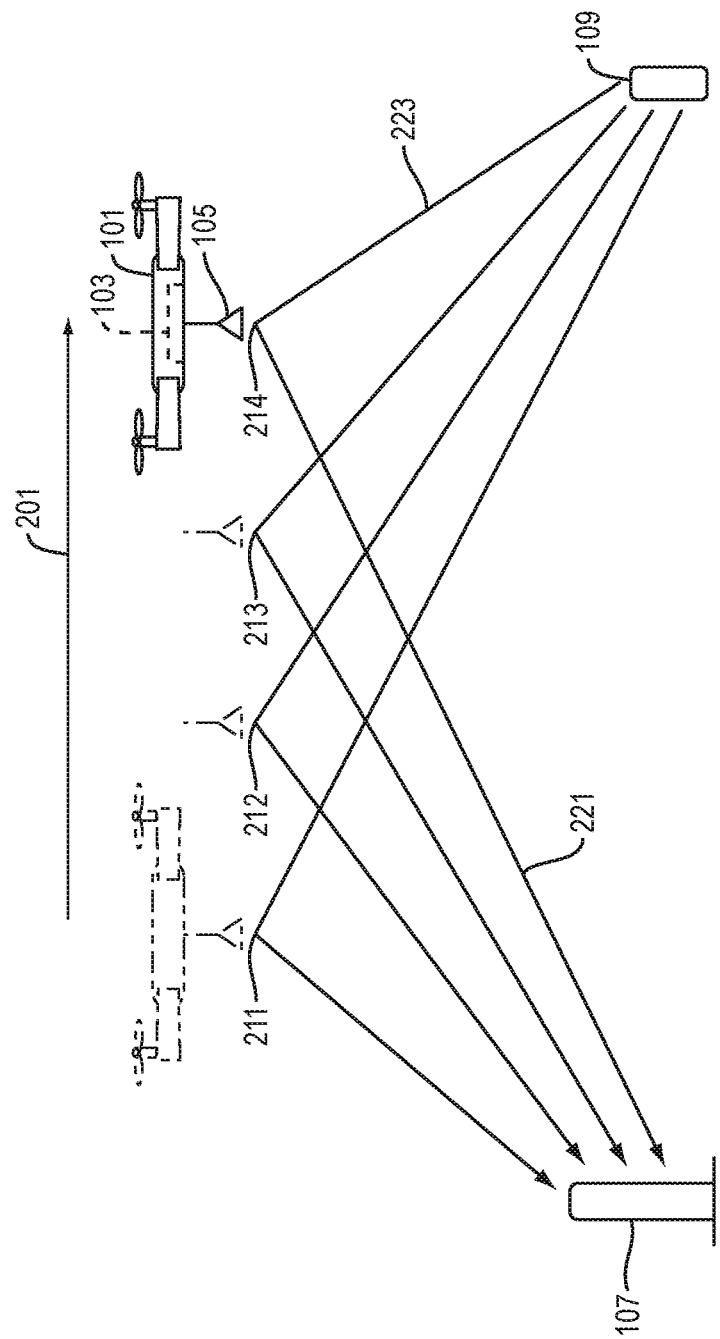
FIG. 2 is a diagram that illustrates the challenge of phase entanglement.

FIG. 2 is a diagram that illustrates the challenge of phase entanglement. In traditional antenna arrays, phase measurements correspond to a direct link between an RF source and an antenna. In contrast, in illustrative implementations of this invention, when a reader measures the phase of an RF signal that has been relayed via the relay (from tag to relay to reader), the phase of the measured signal is an entanglement of the phases attributable to two half-links: one half-link between the reader and relay and the other half-link between the relay and tag. In illustrative implementations of this invention: (a) the phase attributable to the tag-relay half-link is extracted; and (b) this extracted phase encodes information about the distance between the relay and tag.

In the example shown in FIG. 2, a drone 101 houses a relay 103 and travels in a flight path 201. At different points (e.g., 211, 212, 213, 214) in flight path 201, relay 103 relays signals (from tag 109) to reader 107. However, the signal measured by reader 107 entangles the phase attributable to the tag-relay half-link (e.g., 223) and the phase attributable to the reader-relay half-link (e.g., 221).

Mitigating Self-Interference

A challenge that confronted the inventors is self-interference, whereby signals that are forwarded by a relay feed back into the relay's receive antennas. An analog relay (as opposed to a digital relay) may preserve phase and timing of relayed signals. However, if an analog relay were to simply amplify and forward received packets without taking corrective steps to mitigate self-interference, the following problems may occur: (a) the amplified and forwarded signals transmitted by the relay (and feeding back into the relay's receive antennas) may have much higher power than signals received from a distant RFID tag or reader; (b) this amplified feedback may drive the relay into an unstable state whereby it rings as its output feeds back into its input; and (c) because RFID communication may be full-duplex (since RFID tags may communicate by reflecting the reader's signal), the relay may simultaneously suffer from self-interference on both the uplink and the downlink.

Figure 3:
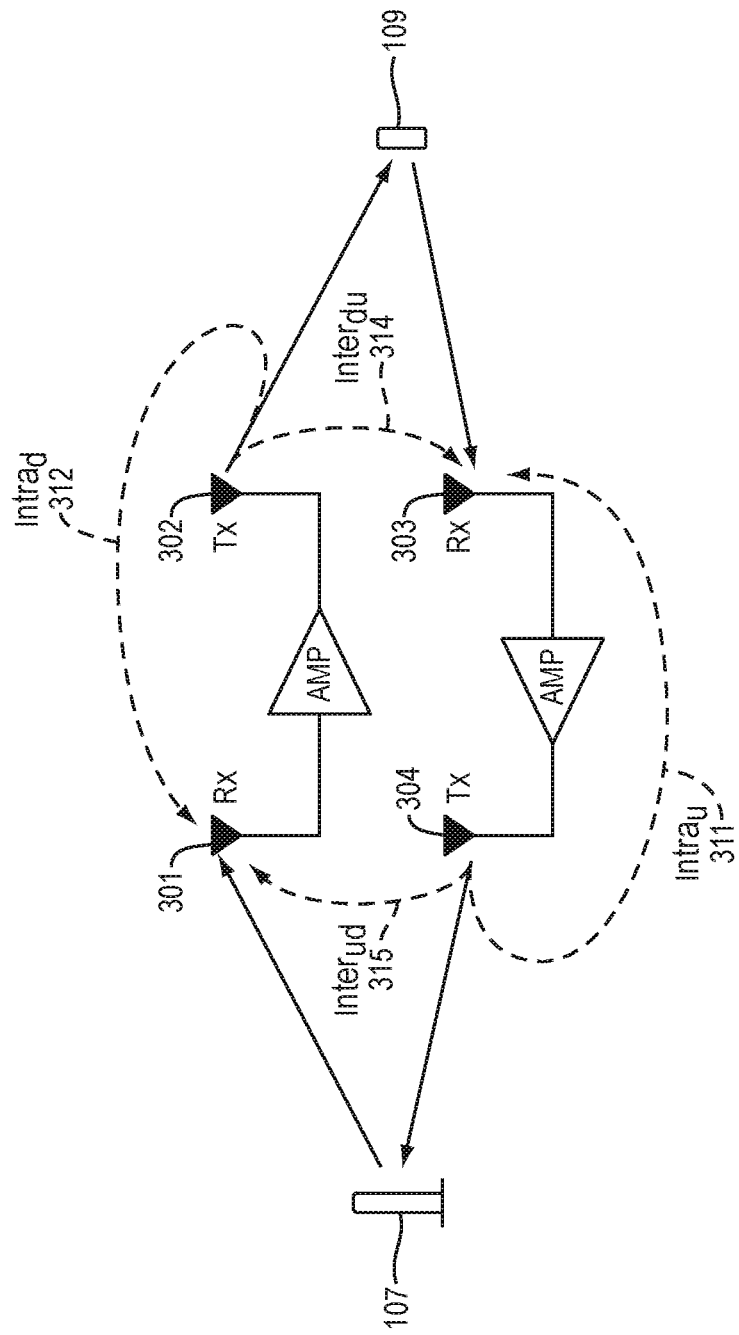
FIG. 3 is a diagram that shows self-interference.

FIG. 3 is a diagram that shows self-interference. In the example shown in FIG. 3, a relay includes a downlink receiver 301, downlink transmitter 302, uplink receiver 303, and uplink transmitter 304. The relay suffers from two types of self-interference: intra-link and inter-link.

Intra-link self-interference comprises interference within a single channel (i.e., within the downlink channel, or within the uplink channel). In FIG. 3, within the uplink channel, intra-link self-interference $Intra_u$ 311 occurs when a signal from the uplink transmitter 304 feeds back into uplink receiver 303. Likewise, within the downlink channel, intra-link self-interference $Intra_d$ 312 occurs when a signal from the downlink transmitter 302 feeds back into downlink receiver 301.

Inter-link self-interference comprises interference between the downlink and uplink channels. In FIG. 3, inter-link self-interference $Inter_{ud}$ 315 occurs when a signal transmitted by uplink transmitter 304 feeds into downlink receiver 301. Likewise, inter-link self-interference $Inter_{du}$ 314 occurs when a signal transmitted by downlink transmitter 302 feeds into uplink receiver 303.

In many implementations of this invention, reducing the amount of self-interference tends to increase the communication range between the relay and the reader. In illustrative implementations, to prevent the relay from oscillating, it is desirable to reduce the self-interference sufficiently to cause the signal arriving from the reader to be greater than the leakage from the relay's transmit antennas.

In illustrative implementations, inter-link interference is reduced by exploiting the fact that the reader's query (on the downlink channel) and the RFID's response (on the uplink channel) occupy different sub-bands around the center frequency used for communication.

Figure 4:
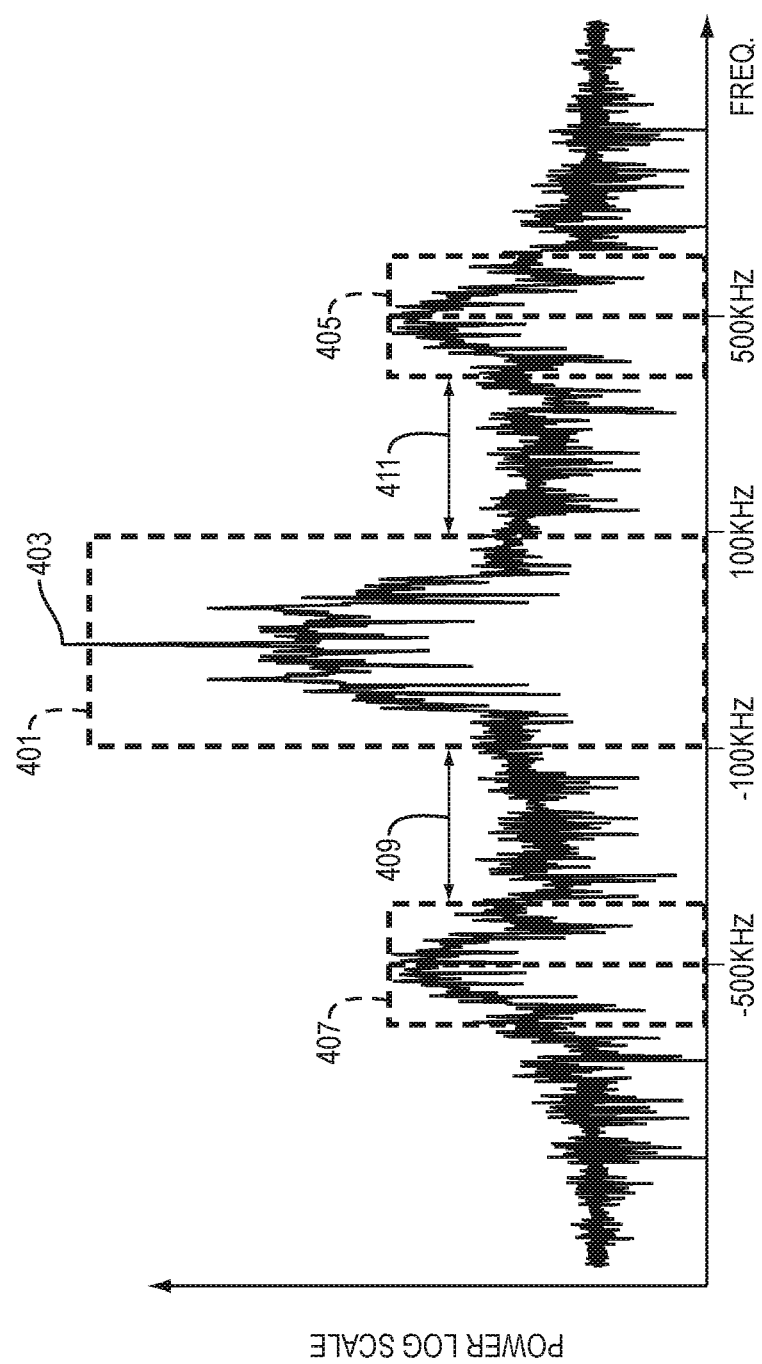
FIG. 4 shows the position of frequency sub-bands relative to center frequency.

FIG. 4 shows the position of frequency sub-bands relative to center frequency. In FIG. 4, the frequency spectrum of a signal transmitted by the downlink transmitter of the analog relay and the frequency spectrum of a signal reflected by an RFD tag (as received by the uplink receiver) are overlaid. In FIG. 4, the signal transmitted by the downlink transmitter occurs in a narrow band 401 (a "center band") that is centered on, and that includes, the reader signal's center frequency. However, the tag signal (i.e., the signal reflected from the RFID tag) is strongest in two narrow bands 405, 407 ("bracket bands") that are on either side of, but do not include, the tag's center frequency. The bracket bands 405, 407 are separated from the center band by two frequency "guard-bands" 409, 411. Thus, in FIG. 4, there are gaps between center band 401 and bracket bands 405, 407. The gaps are occupied by guard-bands 411 and 409, respectively. For example, the EPC Gen2 protocol allows a tag to have a backscatter link frequency (BLF) as high as 640 kHz while the spectrum of reader to tag query command is constrained within 125 kHz.

In illustrative implementations, the relay exploits the guard-bands by implementing filters on the uplink and downlink relays. Note, however, that since the frequency difference between the uplink and downlink may be very small (tens of kHz) in comparison to the center frequency (around 900 MHz), implementing such filtering in passband (i.e., around the center frequency) may require extremely high quality filters. Instead, in illustrative implementations, each channel of the relay, respectively, downconverts, then filters in baseband, and then upconverts.

In illustrative implementations, any type of analog filter (such as Butterworth or Chebyshev) may be employed for low-pass filtering in the downlink channel or bandpass filtering in the uplink channel.

In some implementations: (a) the baseband signal in the downlink channel has a center frequency that is greater than or equal to 1 kHz and less than or equal to 60 kHz; (b) the baseband signal in the uplink channel has a center frequency that is greater than or equal to 200 kHz and less than or equal to 600 kHz and (b) the lowpass filter that filters the baseband signal in the downlink channel has a cutoff frequency that is less than or equal to 120 kHz.

Consider the downlink channel (from the reader to the tag, via the relay). This channel occupies a small bandwidth around the center frequency, as shown in FIG. 4. In the downlink channel, the relay downconverts the received signal to baseband, low-pass filters, then upconverts before transmitting it to the tag. Similarly, on the uplink channel (from tag to reader, via the relay), the relay downconverts to baseband, then bandpass filters around the tag's response, then upconverts back. In illustrative implementations, the filtering described in this paragraph greatly reduces inter-link self-interference that would otherwise occur: (a) due to leakage between uplink transmitter 304 and downlink receiver 301 (Inter$_{ud}$ 315 in FIG. 3); and (b) due to leakage between downlink transmitter 302 and uplink receiver 303 (Inter$_{du}$ 314 in FIG. 3).

The inventors confronted a challenge: how the relay would detect the center frequency of the signal transmitted by the reader. In some cases, a reader may send a query at any center frequency within the 902-928 MHz ISM band. It is desirable for the relay to select that center frequency in order to downconvert and filter in baseband.

In some implementations, the relay perform a frequency sweep in the 902-928 MHz ISM band to determine the frequency of the reader signal that has the highest power, and then select that as the center frequency for downconversion. To do so, the relay may employ a power detection and correlation approach. For example, the relay: (a) may gradually sweep in discrete steps through a band of frequencies (e.g., the 902-928 Mhz ISM band); (b) may determine, at each frequency step, the correlation between the received reader's query preamble and a template preamble for the query (e.g., a template preamble that is required by a protocol); and (c) may choose the frequency where the correlation between the is greatest.

For example, in some cases, the frequency steps in the sweep are approximately 1 MHz and each step in the sweep takes approximately 1 ms. Thus, in some cases, the entire sweeping operation takes approximately 20 ms, after which, the relay locks onto the center frequency of the reader's signal. In certain regions of the world, regulations dictate that the reader hops frequencies every half second according to a prespecified pattern. Once the relay identifies the center frequency at a given point in time, the relay may lock onto the same hopping pattern.

As noted above, intra-link interference occurs within a channel (e.g., within the relay's downlink channel or within the relay's uplink channel). For example, in FIG. 3, intra-link interference Intra$_d$ 312 occurs within the downlink channel due to leakage between the downlink transmitter 302 and downlink receiver 301. Likewise, intra-link interference Intra$_u$ 311 occurs within the uplink channel due to leakage between the uplink transmitter 304 and uplink receiver 303.

In illustrative implementations of this invention, intra-leak interference is greatly reduced by employing an out-of-band full-duplex design, i.e., the relay may transmit at a signal whose frequency is different from the one it receives at. To do so, the relay may employ a downconvert-upconvert approach. For example, on the downlink channel, the relay may downconvert with the reader's center frequency but upconvert with another frequency, thereby effectively achieving frequency division between the reader-relay half-link and the relay-tag half-link.

This approach to reducing intra-link self-interference (by downconverting at one frequency f and upconverting at another frequency f') distorts the phase of a signal relayed by the relay's downlink channel, if one considers only the downlink channel. Specifically, the relay's downlink channel (considered by itself) introduces a carrier frequency offset (CFO) and phase offset into the signal. Mathematically, the downlink channel of the relay generates some frequency f' different than the reader's frequency f, and introduces a random, unknown phase offset $\phi_0$ to the downlink signal. We may express the time-varying induced phase as:

$$\phi'(t) = 2\pi(f-f')t + \phi_0 \qquad \text{Eq. 3}$$

where t is time.

Likewise, this approach to reducing intra-link self-interference (by downconverting at one frequency and upconverting at another frequency) distorts the phase of a signal relayed by the relay's uplink channel, if one considers only the uplink channel.

Thus, the inventors faced a challenge: how to ensure that the net effect of the relay is to preserve phase, even though each of the two channels (uplink and downlink) of the relay may distort phase to prevent intra-link self-interference. It is desirable to configure the relay in such a way that the relay creates a zero net distortion of phase (or only a very small, substantially constant net distortion of phase) in RF round-trip communications. This is because localization may rely on accurate phase measurements In illustrative implementations, this challenge is solved by causing the relay's uplink path to invert the effect of the relay's downlink path by mirroring its behavior. To achieve this inversion, one or more oscillators may be shared between the uplink and downlink channels of the relay.

For example, two shared oscillators may be employed as follows: (a) a first oscillator may output a first signal; (b) this first signal may be fed into a down-converting mixer in the downlink channel; (c) the multiplicative inverse of the first signal may be fed into an up-converting mixer in the uplink channel; (d) a second oscillator may output a second signal; (e) this second signal may be fed into a down-converting mixer in the uplink channel; (f) the multiplicative inverse of the second signal may be fed into an up-converting mixer in the downlink channel. In the example in the preceding sentence: (a) the down-converting mixer in the downlink channel causes a first phase shift $\Delta\phi_1$ but the up-converting mixer in the uplink channel causes an equal (in magnitude) and opposite (in sign) phase shift $-\Delta\phi_1$ which exactly compensates for the first phase shift; and (b) the up-converting mixer in the downlink channel causes a second phase shift $\Delta\phi_2$ but the down-converting mixer in the uplink channel causes an equal (in magnitude) and opposite (in sign) phase shift $-\Delta\phi_2$ which exactly compensates for the second phase shift. For each pair of mixers that share an oscillator, the signal and inverted signal are synchronized because they are from the same oscillator. In the example described in the previous sentence, the uplink channel cancels the phase and timing distortion introduced by the downlink channel, and thus the net effect of the relay is to preserve phase.

Alternatively, one oscillator may be shared by all four mixers. For example: (a) this shared oscillator may output a given signal; (b) the given signal may be fed into the down-converting mixers in the downlink and the uplink channels; and (c) the multiplicative inverse of the given signal may be fed into the up-converting mixers in the downlink and the uplink channels. In the example described in the previous sentence: (a) the signal and inverted signal are synchronized because they driven by the same oscillator; and (b) the uplink channel cancels the phase and timing distortion introduced by the downlink channel, and thus the net effect of the relay is to preserve phase.

In some cases: (a) multiple readers transmit signals to the analog relay, each at a different frequency; (b) the relay automatically selects the frequency of the reader with the strongest receive signal; (c) the relay locks onto the corresponding reader's center frequency; and (d) baseband filters in the downlink and uplink channels filter out the signals of other readers, thereby managing the interference caused by the multiple readers. In some cases, multiple readers transmit at the same frequency. In that case, any method of multi-reader interference management may be employed, such as any method taught by Angerer, C., et al., *RFID Reader Receivers for Physical Layer Collision Recovery*, IEEE Transactions on Communications, Vol. 58, No. 12, December 2010. For example, if two readers are transmitting at the same frequency and their signals collide, then: (a) the relay may employ a single antenna receiver that separates the signal components from the two tags in the I/Q plane; or (b) the relay may employ multiple receive antenna receivers that exploit the spatial domain to separate the signal components of the two tags.

Phase Entanglement and Multipath

In some cases, an analog relay housed in a vehicle (e.g., drone) facilitates localizing (e.g., determining spatial coordinates of) one or more RFID tags. As the vehicle moves in a trajectory, the relay may capture the tags' responses while the relay is at different positions along the trajectory. A computer may treat these measurements (taken by the mobile relay at different positions) as if they were taken by a static antenna array. By applying antenna array equations to these measurements, a computer may localize the RFID tags.

Although this approach has some rough similarities to SAR (synthetic aperture radar), the inventors of the present invention faced at least two challenges that arise because of the relay and that are not found in SAR. These two challenges are: (a) multipath propagation; and (b) phase entanglement. The inventors of the present invention solved both of these challenges, as described in more detail below.

Multipath: Multipath propagation of radio signal tends to distort or otherwise create errors in phase measurements, and thus poses a challenge for localizing passive RFID tags in the environment based on their phase. In illustrative implementations, multi-path propagation occurs when: (a) some of the packets traveling in the tag-relay half-link travel do not travel in a direct, straight path between the tag and relay; and (b) some of the packets traveling in the relay-reader half-link do not travel in a direct, straight path between the relay and reader. Instead, some of the packets may bounce off of different objects in the environment, including walls and furniture. This problem is exacerbated by the fact that the direct path in each of these half-links may be significantly attenuated by an obstacle (e.g., furniture). As a result, the direct path may not always be the path with the strongest signal.

Multipath propagation may be quite strong in many use scenarios of this invention. For example, multipath propagation may be strong in indoor environments where signals bounce off walls, shelves, the floor, and furniture, and inventory.

Figure 5:
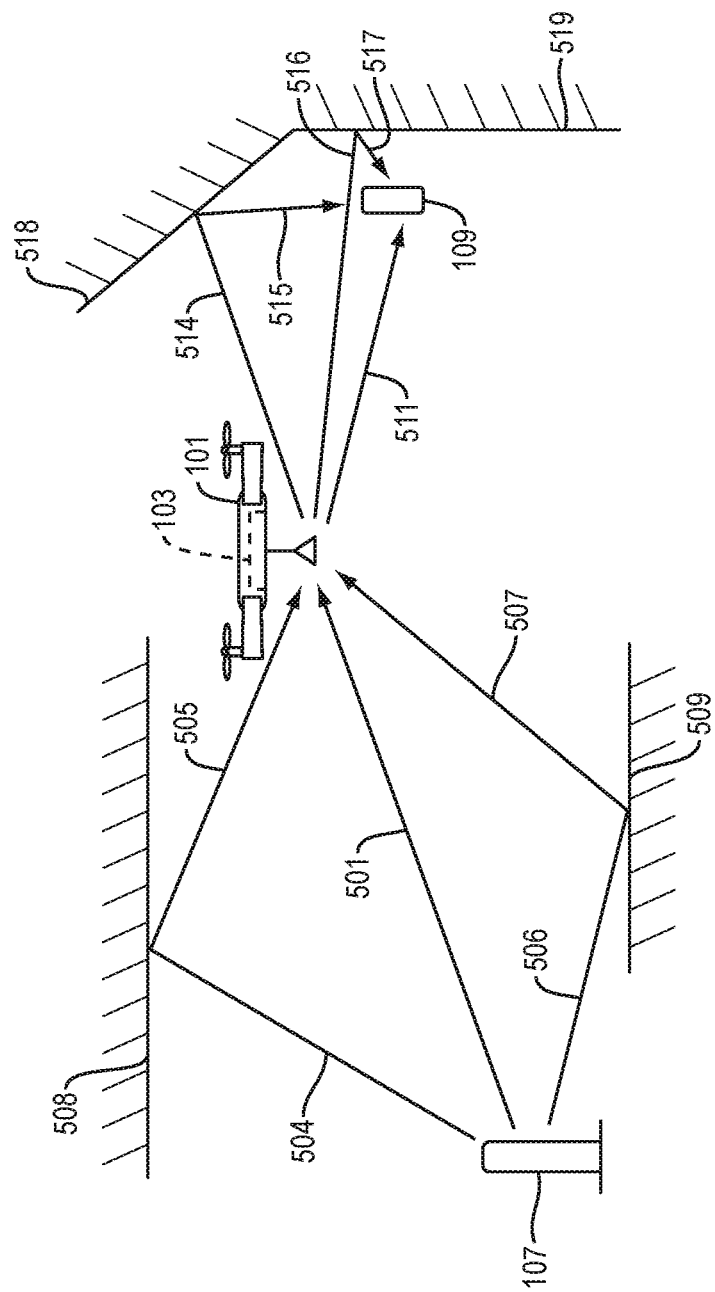
FIG. 5 shows multipath propagation of signals.

FIG. 5 shows multipath propagation of signals, in an illustrative implementation of this invention. In the reader-relay half-link in FIG. 5, some radio signals travel in direct path 501 from reader 107 to relay 103, but other radio signals travel in indirect paths between the reader and relay. For example, some radio signals travel in an indirect path (along lines 504 and 505) that reflects off wall 508, and other radio signals travel in an indirect path (along lines 506 and 507) that reflects off wall 509. Likewise, in the relay-tag half-link in FIG. 5, some radio signals travel in direct path 511 from relay 103 to tag 109, but other radio signals travel in indirect paths between the relay and tag. For example, some radio signals travel in an indirect path (along lines 514 and 515) that reflects off wall 518, and other radio signals travel in another indirect path (along lines 516 and 517) that reflects off wall 519.

In illustrative implementations of this invention, the effects of multipath propagation are reduced by exploiting the fact that indirect reflections (caused by reflectors) always arrive along a longer path than the direct path from the RFID to the relay. Hence, in some cases, the 'ghost" locations caused by multipath reflections are always further from the relay's trajectory than the actual tag location. In illustrative implementations, to avoid the distortions that would otherwise be created by multi-path propagation, a computer determines the peak in Equation 6 that is nearest to the relay's trajectory, instead of the peak that has the highest energy.

Phase entanglement: In conventional antenna arrays, phase measured at each antenna in the array is attributable to a direct path between the antenna and the radio source. In contrast, in the present invention, the phase measured at the reader is attributable to both the reader-relay half-link and the relay-tag half-link. These entangled phases pose a challenge for localization.

In illustrative implementations of this invention, to separate the signals attributable to the two half-links, an RFID tag is embedded with the relay—e.g., as part of the relay itself or housed in the same vehicle (e.g., drone) as the relay. Note that even if the embedded tag is beyond the range (e.g., 3-6 meters) at which the reader may communicate directly with the embedded tag, the reader may still capture its phase through the relay.

In illustrative implementations, to eliminate the impact of the reader-relay half-link on a signal h received from a given RFID tag in the environment, a computer may divide signal h of the given tag (as measured by the reader) by the signal $h_b$ of the embedded tag (as measured by the reader). The signal h' that results from this division may be expressed as:

$$h' = \frac{h}{h_b} = \sum_k e^{-j2\pi f'(2d_k/c)} \qquad \text{Eq. 4}$$

where $d_k$ is the distance between the relay and the given tag in the environment at a given position k of the relay, f' is the center frequency of the signal transmitted by the relay's downlink transmitter, and j is $\sqrt{-1}$.

Thus, to disentangle phases due to two half-links of a relayed signal (which signal is from a tag that is remote the relay, e.g., 3-6 meters away from the relay): (a) another tag may be embedded with the relay; and (b) the signal from the remote tag (as measured by the reader) may be divided by the signal from the embedded tag (as measured by the reader). The result of this division may be a signal that is attributable solely to the relay-tag half link (except for a multiplicative constant that does not affect the result of the localization algorithm).

In some implementations: (a) the embedded RFID tag and the relay share a common antenna and thus are co-located at that antenna; and thus (b) the embedded tag's channel as measured by the reader is attributable solely to the half-link between the reader and the relay. For example, the embedded tag and the relay may share a common antenna where they are both part of a bi-modal circuit that switches between a first mode in which the circuit operates as a passive RFID tag and a second mode in which the circuit operates as bi-directional, full-duplex, phase-preserving, timing-preserving, analog relay.

Figure 6:
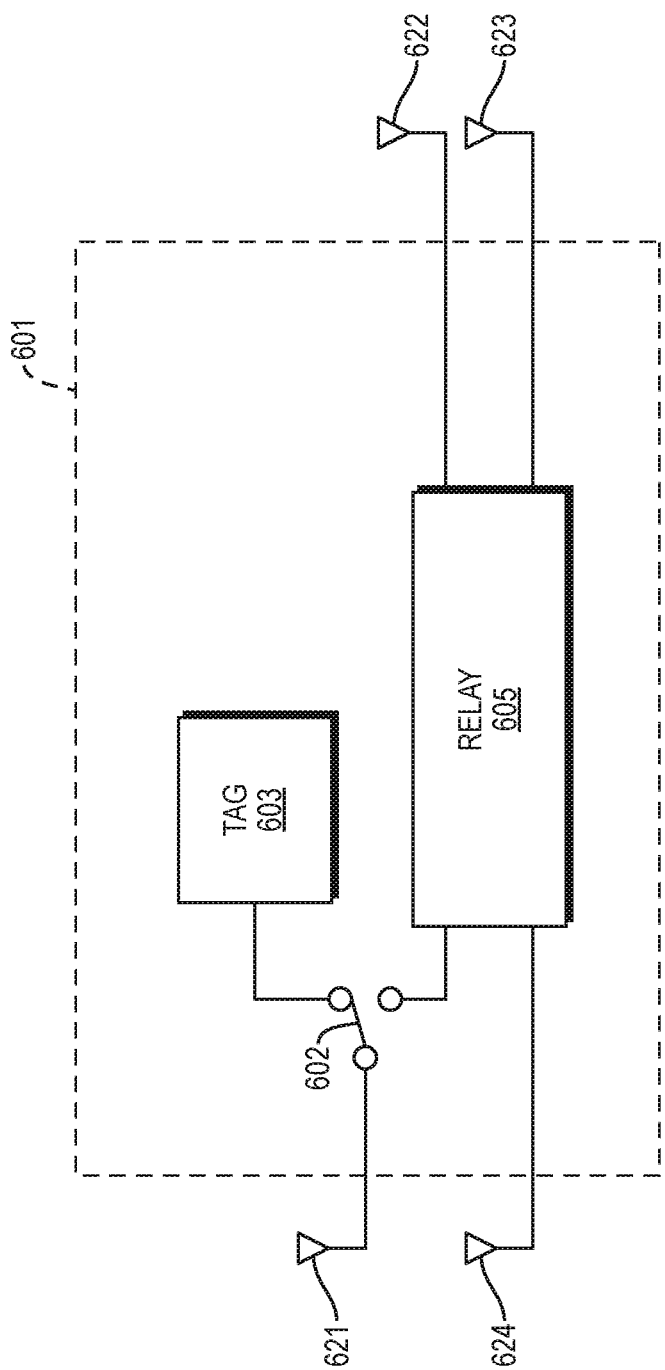
FIG. 6 shows a bi-modal circuit that operates in either RFID tag mode or relay mode.

FIG. 6 shows a bi-modal circuit that operates in either RFID tag mode or relay mode, in an illustrative implementation of this invention. In the example shown in FIG. 6, a bi-modal circuit is housed in a vehicle 601, such as a drone. The bi-modal circuit includes a switch 602, a passive tag 603 and a bi-directional, full-duplex, phase-preserving, timing-preserving, analog relay 605. Toggling the switch 602 may cause the bi-modal circuit to switch between operating as an RFID tag and operating as a relay. In FIG. 6, the tag 603 and relay 605 share a common antenna (e.g., the relay's downlink receiver antenna 621). The relay 605 includes four antennas: downlink receiver antenna 621, downlink transmitter antenna 622, uplink receiver antenna 623, and uplink transmitter antenna 624.

In some implementations: (a) the embedded tag and the relay are housed near each other in the same vehicle, but the embedded tag is separate from the relay and has an antenna that is separate from the antenna(s) of the relay; and (b) the embedded tag's channel as measured by the reader is attributable solely to the reader-relay half-link.

Figure 7:
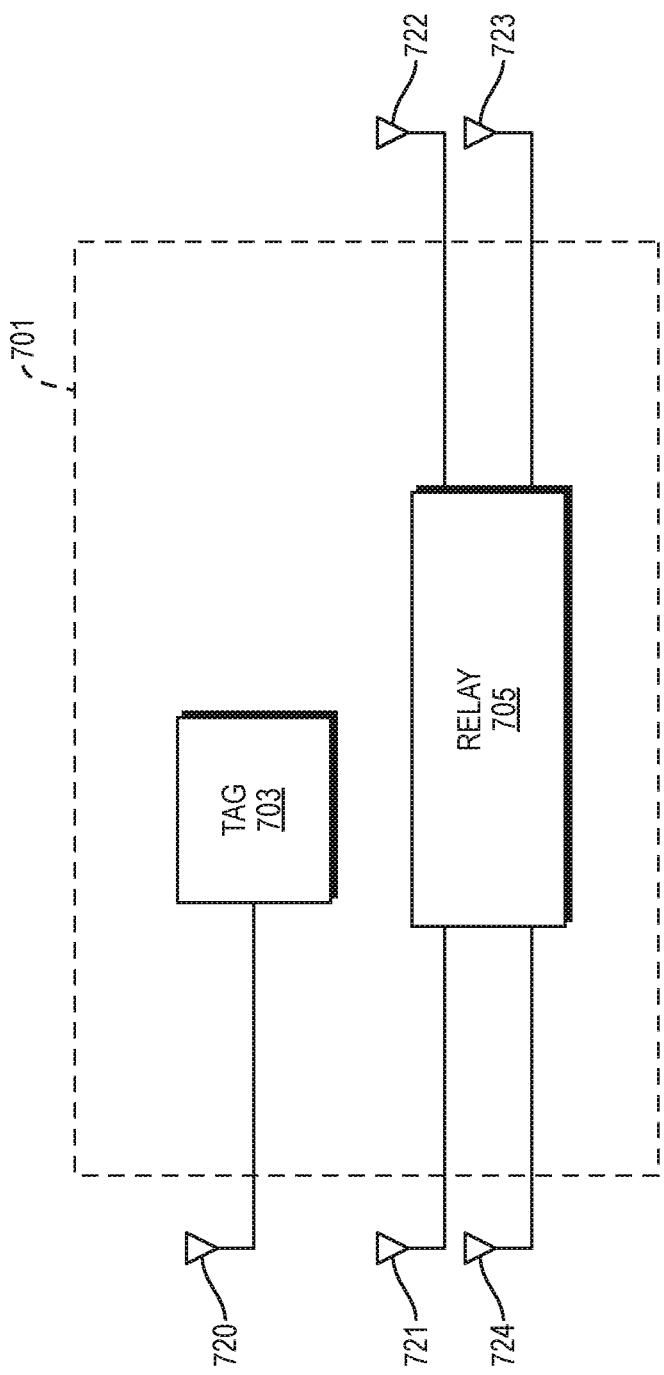
FIG. 7 shows a vehicle (e.g., drone) that includes an embedded RFID tag and a separate relay circuit.

FIG. 7 shows a vehicle (e.g., drone) that includes an embedded RFID tag and a separate relay circuit, in an illustrative implementation of this invention. In the example shown in FIG. 7, a vehicle (e.g., drone) 701 houses a passive tag 703 and a bi-directional, full-duplex, phase-preserving, timing-preserving, analog relay 705. In FIG. 7, the tag 703 and relay 705 do not share a common antenna. The embedded tag 703 includes antenna 720. The relay 705 includes four antennas: downlink receiver antenna 721, downlink transmitter antenna 722, uplink receiver antenna 723, and uplink transmitter antenna 724.

Embedding a passive RFID tag with the relay has at least two other advantages, in some cases.

First, the embedded tag may comply with the EPC Gen2 protocol. Thus, collisions between the embedded RFID tag and other RFID tags in the environment may be avoided. By storing the identifier of the embedded tag on the reader, the reader may distinguish it from other RFIDs in the environment. Second, while the embedded tag may be out of the range of the reader itself at many positions of relay, it is always within the range of the relay. Said differently, regardless of where the relay and embedded tag (which are both housed in a drone or other vehicle) move relative to the reader, the embedded tag may be powered up by the relay since the passive tag is in close proximity to the relay's antennas. Hence, whenever the reader receives a response from the embedded tag, the reader knows that the relay is within the reader's radio range. This enables the reader to recognize when the relay itself is within its radio range whenever it can decode a signal from the embedded tag.

Second, since the channel of the embedded tag may consist entirely of the half-link between the ground-based reader and the relay, this channel may be used to localize the drone itself by leveraging SAR equations.

Localization

In some implementations of this invention: (a) a drone houses a bi-directional, full-duplex, phase-preserving, timing-preserving, analog relay; (b) the drone's movement emulates an antenna array; and (c) a computer applies antenna array equations to perform localization. The relay may, at different positions (which emulate different antennas in an antenna array) relay radio signals from a reader to a passive RFID tag and then back to the reader. A computer may analyze signals that return from the tag to the reader, to isolate the tag-relay channel of these signals. Based on small phase changes in this isolated tag-relay channel (which are due to changing tag-relay distances as the drone moves), the computer localizes the tag (i.e., determines spatial coordinates of the tag). In some implementations, it is desirable to employ non-linear projections (such as in Equation 6, below) since they may synthesize RF measurements over long trajectories.

Consider how this localization method works in 2D space. Every point (x, y) in 2D space may be described by a set of distances from different points along the drone's trajectory.

In some implementations: (a) a line-of-sight signal (as opposed to indirect reflections) between the relay and tag has the highest energy; and (b) a computer may apply a matched filter on all possible locations (in a finite set of discrete locations) and may choose the highest peak.

Consider K locations along the drone's trajectory where the relay captures responses from a given RFID tag. If the coordinates of these points are $(x_1, y_1) \ldots (x_K, y_K)$, and the isolated tag-relay channels for the given RFID tag are) $(h'_1 \ldots h'_K)$, then the 2D location of the tag may be estimated as:

$$(\hat{x}, \hat{y}) = \underset{(x,y)}{\mathrm{argmax}} P(x, y) \qquad \text{Eq. 5}$$

where $$P(x, y) = \left| \sum_{l=1}^{K} h'_l e^{j2\pi \frac{f}{c} 2\sqrt{(x-x_l)^2 + (y-y_l)^2}} \right| \qquad \text{Eq. 6}$$

Thus, a computer may calculate a tag's 2D location from a 1D trajectory of a relay, by employing the non-linear projections in Equation 6.

In some use scenarios—when the RF signal that travels along the line-of-sight path is the strongest and multi-path reflections are weaker—a computer may, based on signals measured by the reader, estimate an RFID tag's location by simply picking the highest peak of P(x, y) in Equation 6.

The localization algorithm set forth in Equation 6 extends to multiple tags in the environment. For example, a standard RFID protocol (EPC Gen2) may read multiple tags, and the localization algorithm may operate on the channels of each of the tags independently.

The localization algorithm set forth in Equation 6 may easily handle scenarios where a passive RFID tag is within the communication range of both the relay and a reader in the environment. In such scenarios, the channel from the (stationary) reader to the tag remains constant, while that from the relay to the tag varies due to motion of the relay. As a result, the constant channel is factored out by Eq. 7 and does not affect the localization results.

It is worth noting that, in illustrative implementations, f (i.e., the center frequency of the RF signal emitted by the reader) may be employed in Equation 6 even though the isolated tag-reader channel has a center frequency at $f_2$. This is because the relay may ensure that $(f-f_2)/f < 0.01$ by shifting the center frequency by as little as 1 MHz while still ensuring that the half-links do not interfere (as discussed above).

In some implementations, employing a mobile relay mitigates the effect of blind spots. This is because a mobile relay may capture each RFID's response from different perspectives. (In contrast, om conventional stationary readers, blind spots pose a major problem due to destructive interference or orientation mismatch).

Indoor environments may have strong multipath signals due to the various reflectors (walls, furniture, ceilings, etc.). In environments where multipath signals are stronger than line-of-sight signals, localization may not be accurate if a computer simply picks the highest peak of P(x, y) in Equation 6.

In some implementations, the inventors solved the multipath problem as follows: In the localization algorithm, a computer may compute multiple possible locations for a tag, where each possible location corresponds to a peak of P(x, y) in Equation 6 that corresponds to a particular path. The computer may then select, out of this set of computed possible locations, the computed location of the tag that is closest to the known, then-current position of the relay. This approach works because: (a) the direct path between the tag and relay is shorter than any path that involves an indirect reflection (e.g., from a reflector such as a wall or furniture); and (b) likewise, the direct path between the relay and reader is shorter than any path that involves an indirect reflection. Thus, in some implementations: (a) "ghost" positions of the tag are detected due to one or more indirect reflections; and (b) for any given position of the relay (while the relay is moving in a path), the distance between the relay and each "ghost" position of the tag is always greater than the distance between the relay and the actual position of the tag.

In some implementations: (a) a relay is mounted in an indoor drone that is traveling in a trajectory; (b) the relay relays a query to a tag approximately once per millisecond; (b) the drone is moving at a slow speed; and (c) thus, the relay acquires samples of the distance between the tag and the relay at different spatial positions along the trajectory, in such a way that the samples are acquired at a high spatial frequency. In some implementations, increasing the temporal frequency of the sampling rate (and thus decreasing the distance between positions of the relay at which samples are acquired), tends to increase the accuracy of the localization of the tag.

Figure 8:
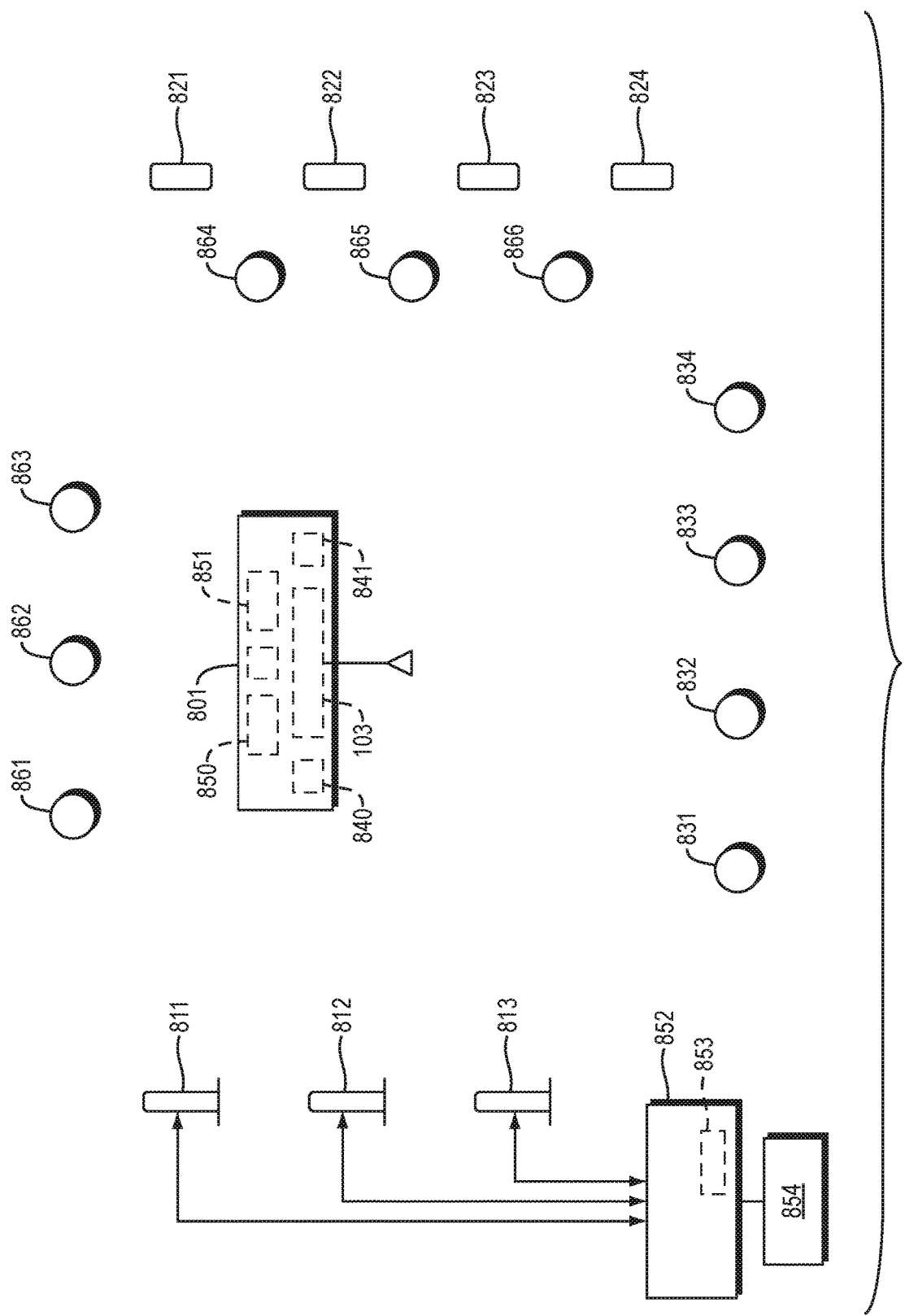
FIG. 8 shows a system that includes a relay housed in a vehicle (e.g., drone) and a tracking system to determine the vehicle's location.

FIG. 8 shows a system that includes a relay housed in a vehicle (e.g., drone) and a tracking system that is configured to determine the vehicle's location, in an illustrative implementation of this invention.

In the example shown in FIG. 8, a vehicle 801 houses a bi-directional, full-duplex, phase-preserving, analog relay 103.

In FIG. 8, vehicle 801 may comprise any type of vehicle. For example, vehicle 801 may comprise a drone. Or, for example, vehicle 801 may comprise an aircraft, a mobile robot, a vehicle that is configured to propel itself along a rail (e.g., a train), a space craft, a water craft (e.g., ship or boat), a vehicle that is configured to propel itself by rolling on one or more wheels (e.g., motor vehicle, automobile, car, truck, motorcycle, truck or bus), a vehicle is configured to propel itself by a moving track (e.g., tank, bulldozer or snowmobile), or a vehicle that is configured to ski on one or more skis (e.g., a snowmobile).

In FIG. 8, RF transceivers 811, 812, 813 may transmit RF downlink signals to relay 103, which may relay these downlink signals to transceivers 821, 822, 823, 824. Likewise, transceivers 821, 822, 823, 824 may backscatter or otherwise transmit RF signals to relay 103, which may relay these signals to transceivers 811, 812, 813.

In FIG. 8, in some cases, transceivers 811, 812, 813 each comprise an RFID reader and transceivers 821, 822, 823, 824 each comprise an RFID tag.

In FIG. 8, an optical navigation system may track location of the vehicle. For example, one or more infrared cameras (e.g., 840, 841) onboard the vehicle may capture images of visual markers (e.g., 831, 832, 833, 834) that are located at fixed positions in the environment. One or more computers (e.g. 850, 851) onboard the vehicle may perform navigational computations, including analyzing the images to determine the vehicle's location, and based on the calculated position, adjusting the direction of travel of the vehicle. The onboard computers (e.g., 850, 851) may control operation of the vehicle, such as by controlling motors and rotors in a drone.

Alternatively, in FIG. 8, a wireless tracking system may track location of the vehicle, based on (among other things) information regarding the spatial coordinates of one or more wireless transmitters that are in fixed, known locations. For example, in FIG. 8, the wireless tracking system may include wireless transmitters 861, 862, 863, 864, 865, 866, which may be in fixed, known locations. The wireless tracking system may also include wireless transceivers 811, 812, 813, which may be in fixed, known locations. The wireless tracking system may track spatial position of the vehicle, based on information about (a) spatial coordinates of wireless transmitters 861, 862, 863, 864, 865, 866, and (b) measurements of relayed signals that are taken by one or more of wireless transceivers 811, 812, 813. For purposes of the preceding sentence, the relayed signals that are measured in the measurements may be signals that are relayed, via relay 103, from transmitters 861, 862, 863, 864, 865, 866 to transceivers 811, 812, 813.

Alternatively, in FIG. 8, the wireless tracking system may track spatial position of the vehicle, based on information about (a) spatial coordinates of wireless transceivers 811, 812, 813, and (b) measurements of relayed signals that are taken by one or more of wireless transceivers 811, 812, 813. For purposes of the preceding sentence, the relayed signals that are measured in the measurements may be signals that are relayed, via relay 103, from transmitters 861, 862, 863, 864, 865, 866 or from transceivers 821, 822, 823, 824.

In FIG. 8, one or more computers (e.g., 852) are positioned remotely from the vehicle and drone. These one or more computers (e.g., 852): (a) may analyze data (including data regarding relayed signals), to determine the location of one or more of the transceivers (e.g., 821, 822, 823, 824); (b) may store data in, and access data from, a memory device 853; (c) may receive input from one or more human users via one or more I/O (input/output) devices 854; and (d) may output information to the users via the one or more I/O devices 854. For example, the one or more I/O devices 854, respectively, may comprise a keyboard, mouse, microphone, touch screen, graphical user interface, display screen, or microphone.

In FIG. 8, in some cases, the position of wireless transceiver 821 is determined based on: (a) received signal strength of a relayed signal from wireless transceiver 821 or (b) time at which a relayed signal from wireless transceiver 821 is detected. For example, in FIG. 8, the vehicle may move in a trajectory. While the vehicle moves, relay 103 (which is housed in vehicle) may at different times relay signals from transceiver 821 to transceiver 811. Transceiver 811 may take measurements of the relayed signals at the different times. A computer may determine spatial coordinates of wireless transceiver 821 based on the received signal strength of the relayed signals (as measured in the measurements) and based on information regarding the trajectory. Or, a computer may determine spatial coordinates of wireless transceiver 821 based on time at which wireless transceiver 811 detects the relayed signal from wireless transceiver 821 and based on information regarding the trajectory.

In FIG. 8, in some cases, the position of transceiver 821 is determined based on measurements of an uplink signal that are taken transceiver 811 at the different times while the vehicle moves through a set of different positions in a trajectory. A computer (e.g., 852) may: (a) calculate a set of distance measurements, by computing, for each of the different positions, respectively, phase of the uplink signal from transceiver 821 as received by relay 103, and (b) calculate, based on the set of distance measurements, spatial coordinates of transceiver 821.

In some implementations, a lightweight relay is housed in a drone and employed to detect and localize battery-free RFIDs.

In FIGS. 1-3 and FIGS. 5-8, one or more tags may each comprise a UHF passive RFID tag.

Figure 9:
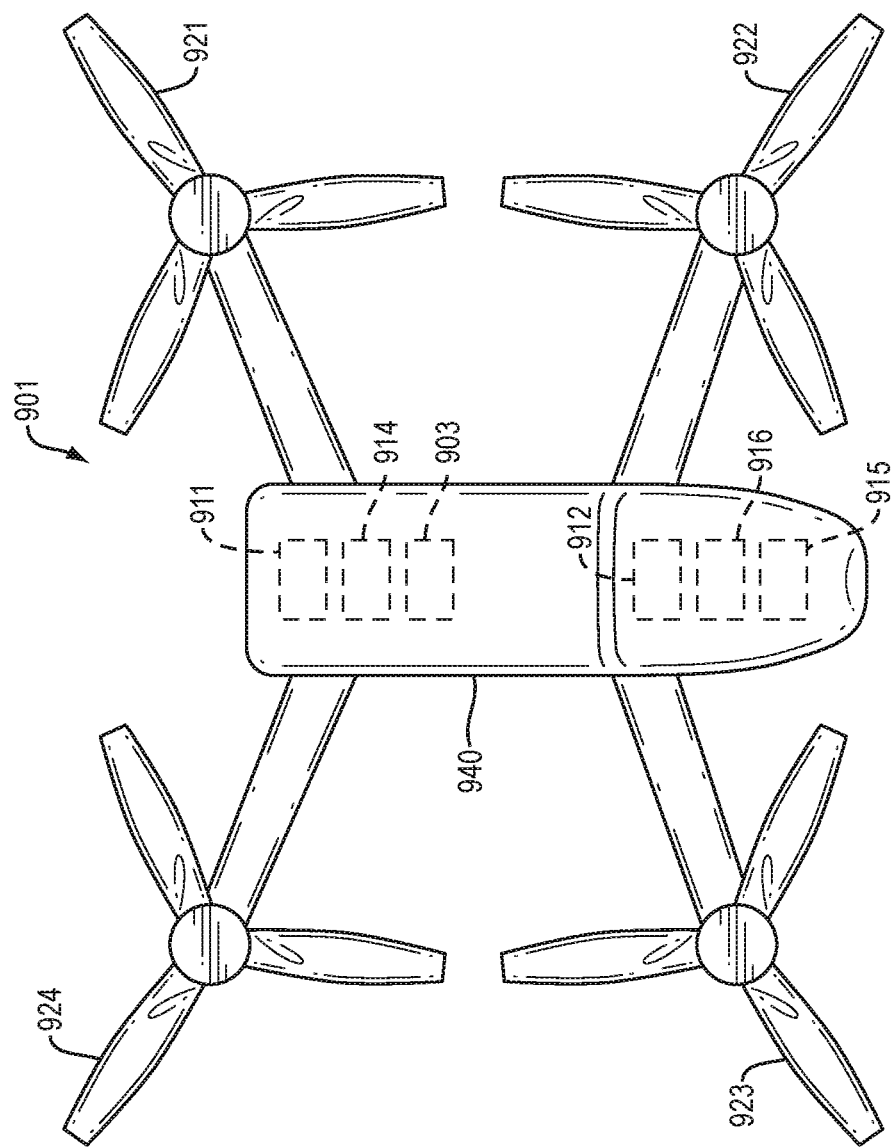
FIG. 9 shows a drone that houses a relay.

FIG. 9 shows a drone that houses a relay, in an illustrative implementation of this invention. In the example shown in FIG. 9, the drone 901 includes a main body 940 that houses a bi-directional, full-duplex, phase-preserving, timing-preserving, analog relay 903. The main body also houses motors (e.g., 911, 912) one or more batteries (e.g., 914), one or more cameras (e.g., 915), and one or more onboard computers (e.g., 916). The motors (e.g. 911, 912) actuate rotation of rotors 921, 922, 923, 924 and adjustment of angular orientation of the rotors. The one or more cameras (e.g., 915) capture images of visual markers in the drone's environment. The one or more computers (e.g., 916): (a) analyze images from the camera to compute the drone's position, and (b) control the motors and rotors to control the drone's flight path.

In some implementations of this invention, a relay has a mirrored architecture to compensate for frequency and phase offsets. The relay may have two paths: a downlink forwarding path and an uplink forwarding path. Each path may employ two RF mixers. In each path, the first mixer may downconvert the signal to baseband while the second mixer upconverts the baseband signal back to passband. The frequencies for upconversion and downconversion may be generated by frequency synthesizers.

Figure 10:
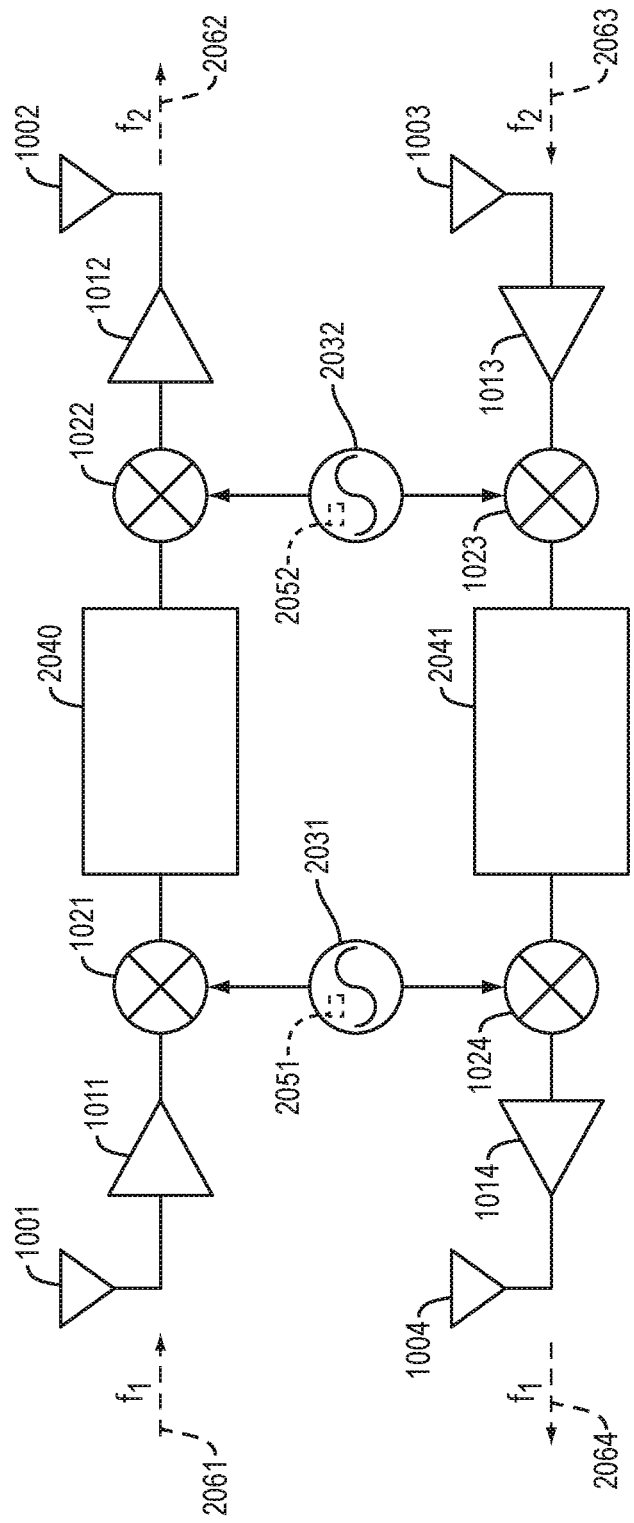
FIG. 10 shows a circuit diagram for a relay, in which two mixers share a first oscillator and another two mixers share a second oscillator.

FIG. 10 shows a circuit diagram for a relay, in an illustrative implementation of this invention. In the example shown in FIG. 10, two mixers share a first oscillator and another two mixers share a second oscillator.

In FIG. 10: (a) in a downlink channel, a signal travels from a reader through a relay to a passive tag, and (b) in an uplink channel, a reflected signal travels from the tag through the relay to the reader. In FIG. 10, the downlink channel and uplink channel are, to a large extent, mirrored, although there are some differences between the two channels. In the downlink channel, RF signal 2061 is emitted by a reader (not shown in FIG. 10), received by downlink receiving antenna 1001, amplified by amplifier 1011, downconverted to baseband by RF mixer 1021, low-pass filtered in baseband by low-pass filter 2040, upconverted by RF mixer 1022, amplified by amplifier 1012, and transmitted via downlink transmitting antenna 1002 as signal 2062 which travels to a passive RFID tag (not shown in FIG. 10). In the uplink channel, RF signal 2063 reflects from the tag, is received by uplink receiving antenna 1003, amplified by amplifier 1013, downconverted to baseband by RF mixer 1023, band-pass filtered in baseband by band-pass filter 2041, upconverted by RF mixer 1024, amplified by amplifier 1014, and transmitted via uplink transmitting antenna 1004 as signal 2064, which travels to the reader. In the example shown in FIG. 10: (a) the center frequency of signals 2061 and 2064 is equal to $f_1$; and (b) the center frequency of signals 2062 and 2063 is equal to $f_2$, where $f_1 \neq f_2$.

In the example shown in FIG. 10: (a) synthesizer 2031 includes oscillator 2051; (b) oscillator 2051 controls the phase and frequency of a first signal that is generated by synthesizer 2031; (c) the first signal and the multiplicative inverse of the first signal are fed into mixers 1021 and 1024, respectively; (d) the phase offset created by mixer 1021 during downconversion in the downlink channel is precisely compensated for by an equal and opposite phase offset created by mixer 1024 during upconversion in the uplink channel; and (e) the frequency offset created by mixer 1021 during downconversion in the downlink channel is precisely compensated for by an equal and opposite frequency offset created by mixer 1024 during upconversion in the uplink channel. Similarly, in FIG. 10, (a) synthesizer 2032 includes oscillator 2052; (b) oscillator 2052 controls the phase and frequency of a second signal that is generated by synthesizer 2032; (c) the second signal and the multiplicative inverse of the second signal are fed into mixers 1022 and 1023, respectively; (d) the phase offset created by mixer 1022 during upconversion in the downlink channel is precisely compensated for by an equal and opposite phase offset created by mixer 1023 during downconversion in the uplink channel; and (e) the frequency offset created by mixer 1022 during upconversion in the downlink channel is precisely compensated for by an equal and opposite frequency offset created by mixer 1023 during downconversion in the uplink channel.

Figure 11:
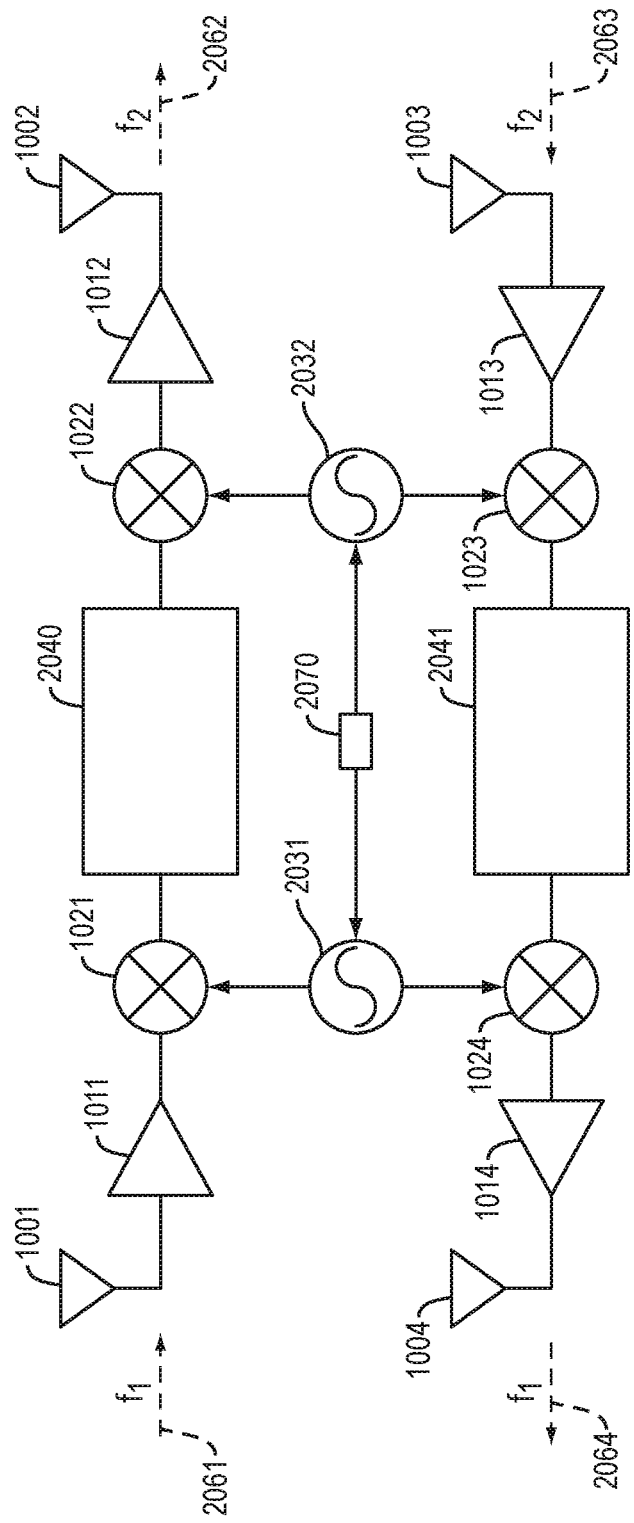
FIG. 11 shows a circuit diagram for a relay, in which all four mixers share the same oscillator.

In FIGS. 10 and 11, the relay circuit includes four antennas (1001, 1002, 1003, 1004). Alternatively, a different number of antennas may be employed. For example, in some implementations, the number of antennas in the relay circuit is reduced to two by employing two circulators that are shared between the downlink and uplink channels.

FIG. 11 shows a circuit diagram for a mobile relay, in which all four mixers share the same oscillator, in an illustrative implementation of this invention. In the example shown in FIG. 11, a single oscillator 2070 controls the phase and frequency of signals generated by both synthesizers 2031 and 2032. In FIG. 11, because synthesizers 2031, 2032 are both controlled by oscillator 2070, they generate synchronized signals that are identical in phase and identical in frequency.

In the example shown in FIG. 11: (a) oscillator 2070 controls the phase and frequency of a first signal that is generated by synthesizer 2031; (b) the first signal and the multiplicative inverse of the first signal are fed into mixers 1021 and 1024, respectively; (c) the phase offset created by mixer 1021 during downconversion in the downlink channel is precisely compensated for by an equal and opposite phase offset created by mixer 1024 during upconversion in the uplink channel; and (d) the frequency offset created by mixer 1021 during downconversion in the downlink channel is precisely compensated for by an equal and opposite frequency offset created by mixer 1024 during upconversion in the uplink channel. Similarly, in FIG. 11: (a) oscillator 2070 controls the phase and frequency of a second signal that is generated by synthesizer 2032; (b) the second signal and the multiplicative inverse of the second signal are fed into mixers 1022 and 1023, respectively; (c) the phase offset created by mixer 1022 during upconversion in the downlink channel is precisely compensated for by an equal and opposite phase offset created by mixer 1023 during downconversion in the uplink channel; and (d) the frequency offset created by mixer 1022 during upconversion in the downlink channel is precisely compensated for by an equal and opposite frequency offset created by mixer 1023 during downconversion in the uplink channel.

Alternatively, in FIGS. 10 and 11, in the downlink channel: (a) mixer 1021 may shift a center frequency of the downlink signal; and (b) filter 2040 may comprise a bandpass filter that bandpass filters the downlink signal. Likewise, alternatively, in FIGS. 10 and 11, in the uplink channel, mixer 1023 may shift a center frequency of the uplink signal, and filter 2041 may bandpass filter the uplink signal.

The following 21 paragraphs describe a prototype of this invention.

In this prototype, the relay has a mirrored architecture to eliminate phase and frequency offsets that would otherwise preclude localization. In this mirrored architecture, many but not all features of the relay's downlink channel are mirrored in the uplink channel.

In this prototype, an analog relay is implemented on a 4-layer FR-4 PCB (printed circuit board). High dielectric ceramic antennas are employed, to reduce system size.

In this prototype, the size of the relay is 10 cm×7.5 cm and the relay's total weight is 35 grams. The relay includes four antennas.

In this prototype, the relay is mounted on a Parrot® Bebop 2 drone. The overall dimension of this Bebop 2 drone is 32 cm×38 cm and it carries a maximum payload of 200 grams.

In this prototype, the drone's battery powers the relay. Because the relay in this prototype requires a 5.5 V DC power supply while the drone's battery output is 12 V, a DC-to-DC converter is inserted between the drone's battery and the relay. The converter is connected to the anode and cathode of the battery via secondary wiring. The relay's total power consumption is 5.8 Watts, drawing 0.49 Amps current from the battery. Since the battery is designed to support up to 21.6 Amps, the relay consumes less than 3% of the capacity of the drone's battery.

In this prototype, an overall system includes a relay housed in the Parrot® Bebop 2 drone, a reader which is compliant with the EPC Gen2 protocol, and off-the-shelf passive RFID tags.

In this prototype, the reader handles a variety of commands including the Query command, ACK command, Select command, and QueryRep Command.

In this prototype, an OptiTrack® optical tracking system measures position of the drone (and thus position of the relay housed in the drone). This optical tracking system comprises an array of infrared cameras mounted on a ceiling, and achieves sub-centimeter localization accuracy in tracking objects tagged with infrared-reflective markers in its line-of-sight. The optical tracking system captures the flight path trajectory of the drone. In addition, the drone's trajectory may also be acquired from its odometry sensors.

In this prototype, self-interference cancellation is achieved through a combination of frequency shifts and baseband filters. Specifically, the relay eliminates inter-link interference through baseband filtering. In this prototype: (a) the downlink channel of the relay includes a low-pass filter with cut-off frequency at 100 kHz; and (b) the uplink channel of the relay includes bandpass filter with center frequency at 500 kHz. As a result, the baseband filter only allows the reader's query command to pass on the downlink; and, the bandpass filter only allows the RFID tag's response to pass on the uplink. Together, the baseband and passband filters effectively block the reader's query signal from leaking from the downlink path to the uplink path and block the RFID tag's response from leaking from the uplink path to the downlink path, achieving high inter-link isolations. To eliminate intra-link interference, the relay uses different frequencies for downconversion and upconversion. The frequencies are separated by a frequency shift larger than the bandwidth of both the lowpass and bandpass filters to ensure that no signal feeds back from the output to input on each of the downlink and uplink paths, resulting in high intra-link isolation.

In this prototype, the downlink and uplink have an amplification chain which is implemented as a serial combination of amplifiers and matching pads. The downlink also employs a power amplifier (PA) at the output with a 1-dB compression point of 29 dBm. To maximize the efficiency of the PA, a drive amplifier is employed. All amplifiers aside from the PA are variable gain amplifiers (VGA) so that the gain in each stage may be tuned independently according to the communication range needed.

In this prototype, the total gain on each of the uplink and downlink is independently constrained by the amount of intra-link isolation. This ensures that each of the links does not resonate through positive feedback.

In this prototype, the sum of all the gains is constrained by the total achievable isolation from both the inter-link and intra-link self-interference cancellation.

In this prototype, the communication range with battery-free RFIDs is primarily limited by the downlink, which delivers power and modulation depth to an RFID tag. Thus, in this prototype, it is desirable to maximize the downlink, subject to the constraints in the preceding two paragraphs.

In this prototype, maximizing the gain on the downlink results in very high power at its output (i.e., high power in the signal transmitted by the downlink transmitter). To avoid saturation at the input of the uplink, in this prototype, most of the uplink gain is shifted to the output of the uplink path, i.e., after the baseband cancellation from the bandpass filter.

In this prototype, inter-link isolations (110 dB and 92 dB) are higher than the intra-link isolations (77 dB and 64 dB). This is because, in this prototype, isolation is achieved primarily through baseband filters that are optimized for maximizing low frequency cancellation (which is used in inter-link isolation) rather than minimizing high frequency feed-through (which results in intra-link leakage). Additional RF filters may be employed to achieve higher isolations.

In this prototype, the downlink isolation is higher than the uplink isolation. This is because the downlink (low-pass) filter results in more attenuation than the uplink (band-pass) filter. This discrepancy is benign since the relay is optimized for downlink isolation, to enable more amplified power delivery to an RFID tag.

In this prototype, the relay only introduces a constant phase offset (due to the hardware path) which is eliminated, for practical purposes, by using a drone-embedded RFID.

In this prototype, the relay achieves more than 70 dB isolation across each of its sources of self-interference. This corresponds to a theoretical range for this prototype of 83 meters in line-of-sight.

In this prototype: (a) most of the gain comes from the reader-relay half-link; (b) the relay-RFID half-link remains restricted to 3-5 m since the relay still powers ups the tag; and (c) the reader-relay half link is primarily limited by isolation.

In tests of this prototype, the system detected passive RFID tags more than 50 m away from the reader with 100% accuracy in line-of-sight and 75% accuracy in non-line-of-sight.

In this prototype, an OptiTrack® optical tracking system is employed to track the position of the drone that houses the relay. This tracking system employs infrared-reflective markers on the drone and the RFIDs to measure their exact locations. In this prototype, the drone remains within the field of view of the OptiTrack® infrared cameras. A computer performs coordinate conversion between the relay's frame of reference and the OptiTrack® system's frame of reference.

The prototype described in the preceding 21 paragraphs is a non-limiting example of this invention. This invention may be implemented in many other ways.

Figure 12:
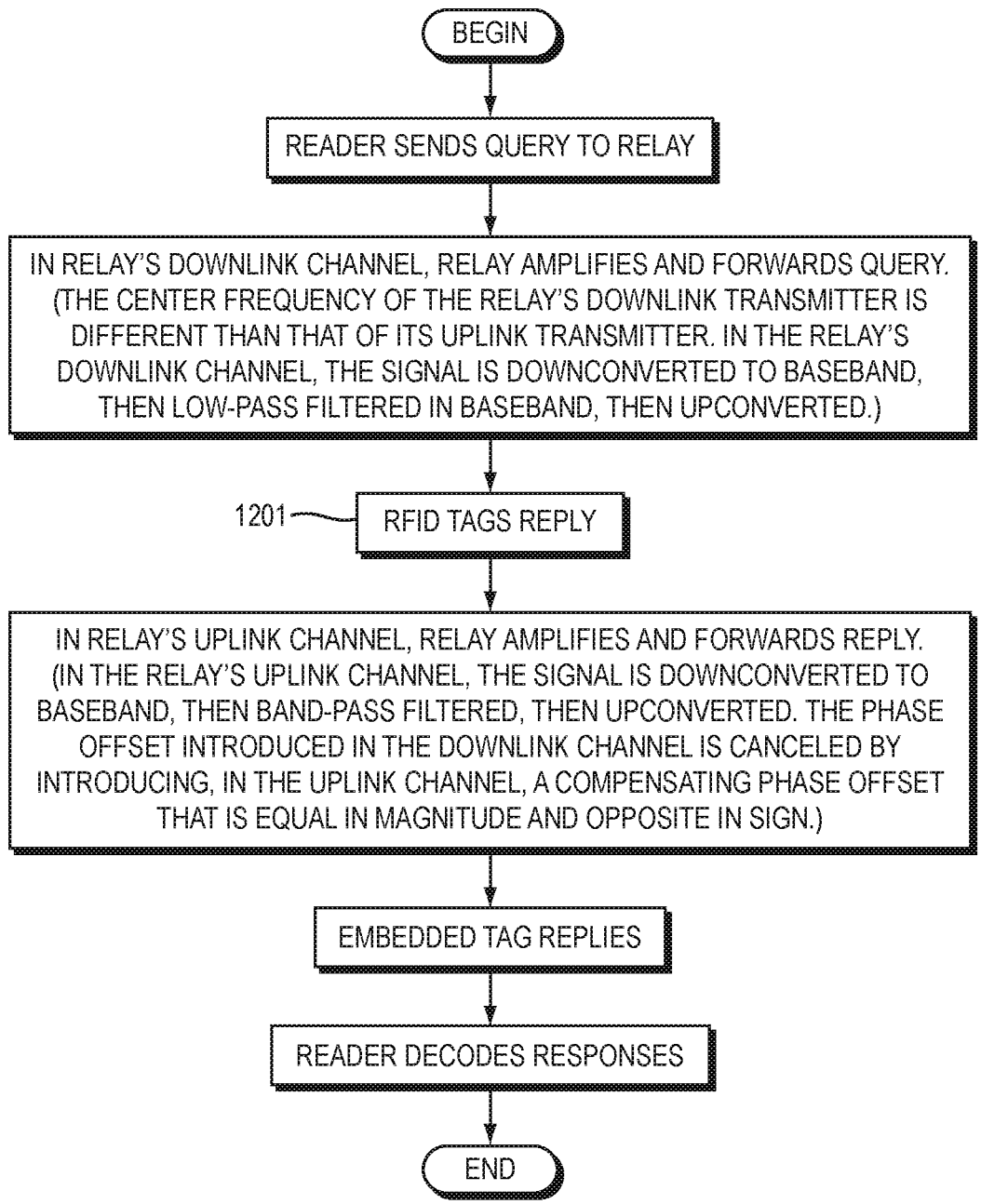
FIG. 12 is a flowchart of a method for relaying RF signals via a bidirectional, full-duplex, phase-preserving relay.

FIG. 12 is a flowchart of a method for relaying RF signals via a bidirectional, full-duplex, phase-preserving relay, in an illustrative implementation of this invention. In the example shown in FIG. 12, the method includes a step 1201 in which RFID tags reply.

Figure 13:
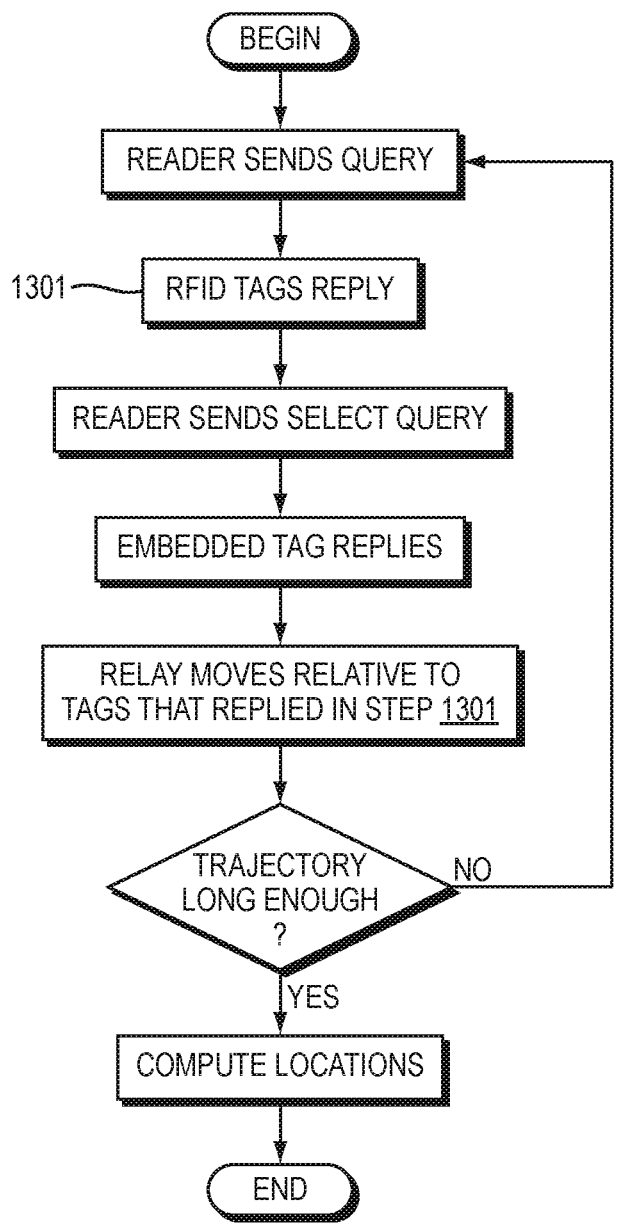
FIG. 13 is a flowchart for a method of localization of RFID tags using a mobile relay.

FIG. 13 is a flowchart for a method of 2D localization of RFID tags using a mobile relay, in an illustrative implementation of this invention. In the example shown in FIG. 13, the method includes a step 1301 in which RFID tags reply.

Alternative Implementations

This invention is not limited to the embodiments described above. This invention may be implemented in many other ways, in addition to or instead of the approaches described above. Here are some non-limiting examples:

This invention is not limited to determining only 2D spatial coordinates of RFID tags. For example, in some cases: (a) the relay is mounted in a vehicle that travels in a 2D trajectory (e.g., at a constant vertical height) while taking samples; and (b) a localization algorithm is performed to determine 3D spatial coordinates of RFID tags.

This invention is not limited to only a single relay. For example, in some cases, an RF signal may be relayed by multiple relays, which may be daisy-chained.

For example, in some implementations, a "daisy-chain" of two or more full-duplex analog relays is employed. In this daisy-chain, each full-duplex relay, respectively, may comprise: (a) an analog downlink relay that receives and retransmits wireless downlink signals, and (b) an analog uplink relay that receives and retransmits wireless uplink signals. In this daisy-chain: (a) a first full-duplex analog relay may receive the downlink signals from a first transmitter (e.g., an RFID reader); (b) a second full-duplex analog relay may transmit the downlink signals to a backscatter node (e.g., an RFID tag); (c) the second full-duplex relay may receive the uplink signals from the backscatter node (e.g., tag); and (d) the first full-duplex relay may transmit the uplink signals to the first transmitter (e.g., reader). The daisy-chain may also include one or more intermediate full-duplex analog relays. In some cases, in which the daisy-chain includes intermediate full-duplex relays, each downlink signal may (a) may be received and retransmitted by the first full-duplex relay, (b) then received and retransmitted by each of the intermediate full-duplex relays in the daisy-chain successively, from one intermediate full-duplex relay to another, until the downlink signal has been relayed by each of the intermediate full-duplex relays, and then (c) received and retransmitted by the second full-duplex relay. Likewise, in some cases, in which the daisy-chain includes intermediate full-duplex relays, each uplink signal (a) may be received and retransmitted by the second full-duplex relay, (b) then received and retransmitted by each of the intermediate full-duplex relays in the daisy-chain successively, from one intermediate full-duplex relay to another, until the downlink signal has been relayed by each of the intermediate full-duplex relays, and then (c) received and retransmitted by the second full-duplex relay.

The uplink signals may be relayed through the daisy-chain in an opposite communication direction to that in which the downlink signals are relayed through the daisy-chain.

In some implementations, for each full-duplex analog relay in the daisy-chain: (a) the downlink relay of the full-duplex relay transmits at a center frequency that is different than at which all other downlink relays in the system transmit; (b) the uplink relay of the full-duplex relay transmits at a center frequency that is different than at which all other uplink relays in the system transmit; (c) the downlink signals transmitted by the downlink relay of the full-duplex relay have a first spectrum; (d) the uplink signals received by the uplink relay of the full-duplex relay have a second spectrum that is different than the first spectrum; (e) the downlink relay of the full-duplex relay includes an analog downlink filter; (f) the uplink relay of the full-duplex relay includes an analog uplink filter; and (b) the uplink and downlink filters filter the uplink and downlink signals, respectively, in such a way as to attenuate a first leakage and a second leakage, the first leakage being leakage, to the uplink relay of the full-duplex relay, of downlink signals transmitted by the downlink relay of the full-duplex relay, and the second leakage being leakage, to the downlink relay of the full-duplex relay, of uplink signals transmitted by the uplink relay of the full-duplex relay.

Figure 14:
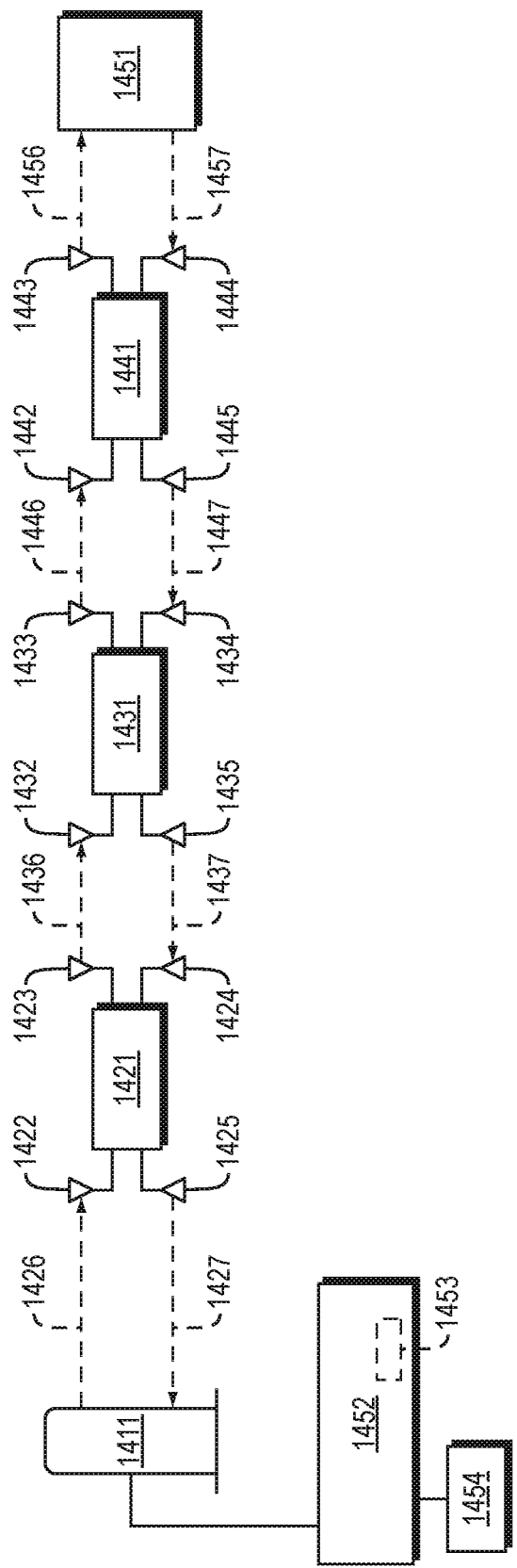
FIG. 14 is a diagram of "daisy-chained" relays.

FIG. 14 is a diagram of "daisy-chained" relays, in an illustrative implementation of this invention. In the example shown in FIG. 14, a "daisy-chain" of three full-duplex analog filters 1421, 1431, 1441 relay downlink signals from a first transmitter 1411 to a second transmitter 1451. For example, first transmitter 1411 may comprise a transceiver (e.g., an RFID reader) and second transmitter 1451 may comprise a backscatter node (e.g., an RFID tag).

In the example shown in FIG. 14, a downlink signal may be: (a) transmitted by transceiver 1411 along path 1426 and received by antenna 1422 of relay 1421; (b) then retransmitted by antenna 1423 of relay 1421 along path 1436 and received by antenna 1432 of relay 1431; (b) then retransmitted by antenna 1433 of relay 1431 along path 1446 and received by antenna 1442 of relay 1441; and (c) then retransmitted by antenna 1443 of relay 1441 along path 1456 and received by transceiver 1451. Likewise, in FIG. 14, an uplink signal may be: (a) transmitted by transceiver 1451 along path 1457 and received by antenna 1444 of relay 1441; (b) then retransmitted by antenna 1445 of relay 1441 along path 1447 and received by antenna 1434 of relay 1431; (b) then retransmitted by antenna 1435 of relay 1431 along path 1437 and received by antenna 1424 of relay 1421; and (c) then retransmitted by antenna 1425 of relay 1421 along path 1427 and received transceiver 1411.

In FIG. 14, a computer 1452 may control and interface with transceiver 1411, including controlling transmission of downlink signals by transceiver 1411 and controlling timing of measurements by transceiver 1411. Computer 1452 may also analyze measurements of relayed signals taken by transceiver 1411, e.g., to estimate spatial coordinates of transceiver 1451. Computer 1452: (a) may store data in, and access data from, a memory device 1453; (b) may receive input from one or more human users via one or more I/O (input/output) devices 1454; and (c) may output information to the users via the one or more I/O devices 1454. For example, the one or more I/O devices 1454, respectively, may comprise a keyboard, mouse, microphone, touch screen, graphical user interface, display screen, or microphone.

Figure 15:
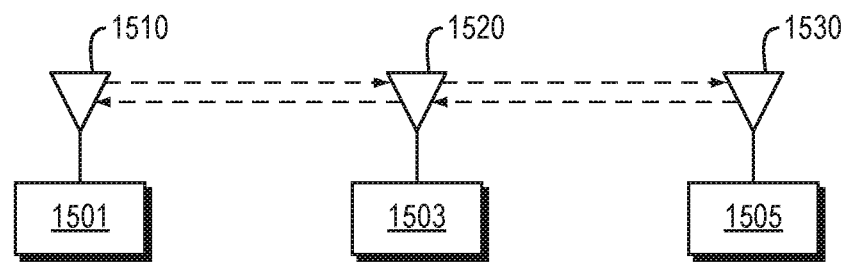
FIG. 15 shows an analog relay that relays RF signals to an RF energy-harvesting sensor.

FIG. 15 shows an analog relay that relays RF signals to an RF energy-harvesting sensor, in an illustrative implementation of this invention. In the example shown in FIG. 15, a bi-directional, full-duplex, analog relay 1503 relays RF downlink signals, by receiving the downlink signals from a transceiver 1501 and retransmitting them to an RF energy-harvesting sensor 1505. Sensor 1505 may be wirelessly powered by these downlink signals. In some cases, sensor 1505 does not include on-board batteries. In other cases, sensor 1505 does include on-board batteries. In FIG. 15, full-duplex relay 1503 relays uplink signals, by receiving the uplink signals from RF energy-harvesting sensor 1505 and retransmitting them to transceiver 1501. In FIG. 15: (a) transceiver 1501 has one or more antennas 1510; (b) relay 1503 has one or more antennas 1520; and (c) sensor 1505 has one or more antennas 1530.

Figure 16:
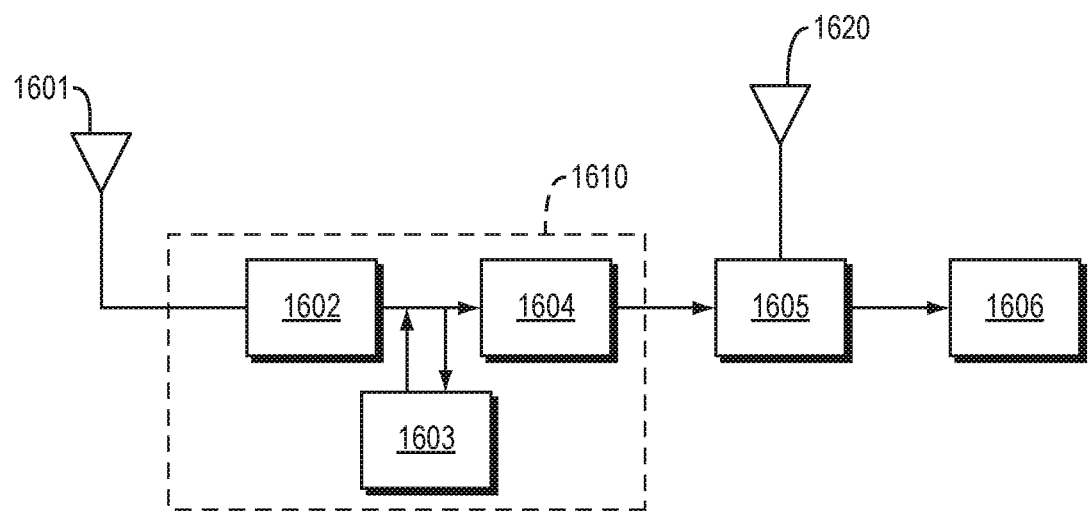
FIG. 16 shows an RF energy-harvesting sensor.

FIG. 16 shows an RF energy-harvesting sensor. In the example shown in FIG. 16, the sensor includes antenna 1601, a power module 1610, a microcontroller 1605 and a sensing module 1606. Antenna 1601 receives a RF downlink signal that is relayed by one or more full-duplex, analog relays (not shown in FIG. 16). The full-duplex relay(s) may be any full-duplex, analog relay described herein. In FIG. 16, power module 1610 includes a power-harvesting circuit 1602, a battery 1603, and a voltage regulator 1604. Power that is harvested, voltage-regulated (and in some cases, stored) in power module 1610 may power microcontroller 1605, which in turn may power sensing module 1606. Sensing module 1606 may include one or more sensors that are configured to measure any physical phenomenon, including temperature, pressure, humidity, pH, viscosity, elasticity, vibration, acceleration, velocity, speed, sound, visible light, infrared light, magnetism, capacitance, electrical current, charge or impedance, distance, or proximity. Microcontroller 1605 may cause sensor readings to be transmitted via antenna 1620. Alternatively, antenna 1620 may be omitted and the sensor readings may be transmitted via antenna 1601.

This invention is not limited to a system in which the position of a mobile relay is determined by optical tracking. For example, in some cases, the position of the mobile relay is determined by analyzing backscattered RF signals from backscattering objects whose positions are known. For example, in some cases, reflected signals from RFID tags that are in fixed, known positions are analyzed to determine, in real-time, the position of a mobile relay.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a reader, radar source, or other active emitter of RF signals; (2) to analyze relayed signals that are measured by a reader, including (a) to extract a unique ID that identifies a particular RFID tag, (b) to identify an embedded tag signal (i.e., a signal from a tag that is embedded in a vehicle that houses a relay), or (c) to extract a signal that corresponds to a relay-tag half-link by dividing by an embedded tag signal; (3) to perform a localization algorithm to determine 2D or 3D spatial coordinates of an RFID tag or of another backscattering object; (4) to control an optical tracking system; (5) to determine position of a mobile machine (e.g., a drone) that houses a relay, based on sensor measurements acquired by an optical tracking system; (6) to determine position of a mobile relay, based on RF signals reflected from tags that are in known positions; (7) to receive data from, control, or interface with one or more sensors; (8) to perform any other calculation, computation, program, algorithm, or computer function described or implied herein; (9) to receive signals indicative of human input; (10) to output signals for controlling transducers for outputting information in human perceivable format; (11) to process data, to perform computations, and to execute any algorithm or software; and (12) to control the read or write of data to and from memory devices (items 1-12 of this sentence being referred to herein as the "Computer Tasks"). The one or more computers (e.g. 850, 851, 852, 916, 1452, 1605) may, in some cases, communicate with each other or with other devices: (a) wirelessly, (b) by wired connection, (c) by fiber-optic link, or (d) by a combination of wired, wireless or fiber optic links.

In illustrative implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 811, 812, 813, 840, 841, 850, 851, 852, 854, 915, 916, 1411, 1452, 1454, 1605) are configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 850, 851, 852, 916, 1452, 1605) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11, IEEE 802.15, IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

"Backscatter node" means an object that backscatters an RF signal. Non-limiting examples of a "backscatter node" include: (a) an RFID tag that backscatters an RF signal; and (b) an object that backscatters a radar signal.

To compute "based on" specified data means to perform a computation that takes the specified data as an input.

"Center frequency" of a signal means a frequency at which the highest peak of the power spectrum of the signal occurs.

To receive or transmit a signal "at" a specific center frequency means to receive or transmit a signal that has the specific center frequency.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

"Downconvert" a signal means to reduce the center frequency of the signal by a factor of at least ten. A non-limiting example of "downconverting" a signal is to reduce the center frequency of the signal from 100 MHz to 9 MHz.

"Downlink relay" means a relay that is configured to transmit a downlink signal.

A non-limiting example of a "downlink signal" is a signal travels from an RFID reader via a relay to an RFID tag.

For an event to occur "during" a time period, it is not necessary that the event occur throughout the entire time period. For example, an event that occurs during only a portion of a given time period occurs "during" the given time period.

The term "e.g." means for example.

Each equation above is referred to herein by the equation number set forth to the right of the equation. For example, "Equation 1" means Eq. 1 above. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

To say that A is "inferable" from B and C means that A is inferable from information that includes B and C.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

A non-limiting example of a "mobile relay" is a relay that is housed in, embedded in, or mounted on, a vehicle.

To "multiply" includes to multiply by an inverse. Thus, to "multiply" includes to divide.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

Unless the context clearly indicates otherwise, a "passive" tag means an RFID tag that is wirelessly powered by RF transmission. A tag may be "passive", as that term is used herein, even though the tag modulates a signal before reflecting the signal.

"Radio frequency" or "RF" means a frequency that is greater than or equal to 3 Hz and less than or equal to 3 THz.

"Radio frequency center frequency" or ""RF center frequency" means a center frequency that is a radio frequency.

As used herein, "reader" means an RFID reader.

Unless the context clearly indicates otherwise, to say that an antenna or relay "receives" a signal means that the antenna or relay receives a wireless signal.

A transceiver is a non-limiting example of a "receiver".

"RFID" means radio-frequency identification.

As used herein, the term "set" does not include a group with no elements.

As used herein, a "signal" may undergo one or more transformations. A non-limiting example of transformations that a single signal may undergo is being transformed from a wireless signal into an electrical signal that propagates through a wire and then being transformed back into a wireless signal. Another non-limiting example of transformations that a single signal may undergo is being downconverted, then filtered, then upconverted.

Unless the context clearly indicates otherwise, "some" means one or more.

As used herein, a "subset" of a set consists of less than all of the elements of the set.

"Spectrum" of a signal means the power spectrum of the signal.

To say that X is "substantially constant" throughout a period means that X has a value that is always within a single range throughout the period, in such a way that: (a) the lowest value in the range is equal to a constant number minus two percent of the absolute value of the constant number; (b) the highest value in the range is equal to the constant number plus two percent of the absolute value of the constant number; and (c) the lowest and highest values of the range are constant throughout the period. As a non-limiting example, if X is equal to 100 at one time during a period and is equal to 125 at another time during the period, then X is not "substantially constant" during the period.

To say that two numbers are "substantially equal" means that the two numbers are each within the same range, which range (a) has a lower bound that is equal to a constant number minus two percent of the absolute value of the constant number, and (b) has an upper bound that is equal to the constant number plus two percent of the absolute value of the constant number. As non-limiting examples: (a) 100 and 101 are "substantially equal" to each other; and (b) 100 and 125 are not "substantially equal" to each other.

As used herein, "tag" means an RFID tag.

"Transceiver" means a device that includes both a wireless transmitter and a wireless receiver. Nonlimiting examples of a transceiver include: (a) a device in which a wireless transmitter and a wireless receiver share common circuitry; (b) a device that houses both a wireless transmitter and a wireless receiver in a single housing; or (c) a device that includes both a wireless transmitter and a wireless receiver, wherein the wireless transmitter and wireless transceiver do not share common circuitry and are not housed together in a single housing.

To say that a machine-readable medium is "transitory" means that the medium is a transitory signal, such as an electromagnetic wave.

As used herein: (a) a non-limiting example of "transmission" of a signal is reflection or backscattering of the signal; and (b) a non-limiting example of a device "transmitting" a signal is an RFID tag reflecting or backscattering the signal.

A transceiver is a non-limiting example of a "transmitter".

Unless the context clearly indicates otherwise, to say that an antenna or relay "transmits" a signal means that the antenna or relay transmits a wireless signal.

"UHF" or "Ultra-High Frequency" means a frequency that is greater than or equal to 300 MHz and less than or equal to 3 GHz.

"Upconvert" a signal means to increase the center frequency of the signal by a factor of at least ten. A non-limiting example of "upconverting" a signal is to increase the center frequency of the signal from 9 MHz to 100 MHz.

"Uplink relay" means a relay that is configured to transmit an uplink signal.

A non-limiting example of an "uplink signal" is a signal travels from an RFID tag via a relay to an RFID reader.

To "wirelessly power" a device means to partially or entirely power the device by one or more wireless signals.

A "wireless receiver" means a receiver that is configured to transmit a wireless signal.

A "wireless tracking system" means a tracking system that includes a wireless receiver and a wireless transmitter.

A "wireless transmitter" means a transmitter that is configured to transmit a wireless signal.

A matrix may be indicated by a bold capital letter (e.g., D). A vector may be indicated by a bold lower case letter (e.g., $\alpha$). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a full-duplex analog relay comprising: (a) an analog uplink relay; and (b) an analog downlink relay, wherein (i) the downlink relay is configured to receive wireless downlink signals from a transmitter and to transmit the downlink signals to a backscatter node, the downlink signals having a first spectrum when transmitted by the downlink relay, (ii) the uplink relay is configured to receive wireless uplink signals from the backscatter node and to transmit the uplink signals to the transmitter, the uplink signals having a second spectrum when received by the uplink relay from the backscatter node, the second spectrum being different than the first spectrum, (iii) the downlink relay includes an analog downlink filter, (iv) the uplink relay includes an analog uplink filter, and (v) the uplink and downlink filters are configured to filter the uplink and downlink signals, respectively, in such a way as to attenuate a first leakage and a second leakage, the first leakage being leakage, to the uplink relay, of downlink signals transmitted by the downlink relay, and the second leakage being leakage, to the downlink relay, of uplink signals transmitted by the uplink relay. In some cases: (a) the downlink relay is configured (i) to downconvert the downlink signals, to lowpass filter the downlink signals in baseband, and to upconvert the downlink signals, or (ii) to shift center frequency of the downlink signals and to bandpass filter the downlink signals; and (b) the uplink relay is configured (i) to downconvert the uplink signals, to bandpass filter the uplink signals in baseband, and to upconvert the uplink signals, or (ii) to shift center frequency of the uplink signals and to bandpass filter the uplink signals. In some cases: (a) the downlink relay is configured to receive the downlink signal at a first center frequency and to transmit the downlink signal at a second center frequency; and (b) the uplink relay is configured to receive the uplink signal at the second center frequency and to transmit the uplink signal at the first center frequency. In some cases: (a) the downlink relay is configured to create a first phase offset in the downlink signals; (b) the uplink relay is configured to create a second phase offset in the uplink signals; and (c) the second phase offset is opposite in sign and substantially equal in magnitude to the first phase offset. In some cases, the full-duplex analog relay is configured to relay the downlink and uplink signals in such a way that, for a specific phase and a specific frequency of downlink signal received by the downlink relay, the downlink and uplink relays together create a net phase offset that is substantially constant, the net phase offset being equal to the absolute value of the difference between the first and second phase offsets. Each of the cases described above in this paragraph is an example of the full-duplex analog relay described in the first sentence of this paragraph, and is also an example of an embodiment of this invention that may be combined with other embodiments of this invention.

In some implementations, this invention is a system comprising two or more full-duplex analog relays, wherein: (a) each full-duplex analog relay, respectively, in the system comprises (i) an analog downlink relay that is configured to receive and retransmit wireless downlink signals, and (ii) an analog uplink relay that is configured to receive and retransmit wireless uplink signals; and (b) the system is configured to relay the downlink signals and the uplink signals in such a way that (i) a first full-duplex analog relay in the system receives the downlink signals from a first transmitter, (ii) a second full-duplex analog relay in the system transmits the downlink signals to a backscatter node, (iii) the second full-duplex analog relay receives the uplink signals from the backscatter node, (iv) the first full-duplex analog relay transmits the uplink signals to the first transmitter, and (v) for each respective full-duplex analog relay in the system (A) the downlink relay of the respective full-duplex relay transmits at a center frequency that is different than at which all other downlink relays in the system transmit, (B) the uplink relay of the respective full-duplex relay transmits at a center frequency that is different than at which all other uplink relays in the system transmit, (C) the downlink signals transmitted by the downlink relay of the respective full-duplex relay have a first spectrum, (D) the uplink signals received by the uplink relay of the respective full-duplex relay have a second spectrum that is different than the first spectrum, (E) the downlink relay of the respective full-duplex relay includes an analog downlink filter, (F) the uplink relay of the respective full-duplex relay includes an analog uplink filter, and (G) the uplink and downlink filters are configured to filter the uplink and downlink signals, respectively, in such a way as to attenuate a first leakage and a second leakage, the first leakage being leakage, to the uplink relay of the respective full-duplex relay, of downlink signals transmitted by the downlink relay of the respective full-duplex relay, and the second leakage being leakage, to the downlink relay of the respective full-duplex relay, of uplink signals transmitted by the uplink relay of the respective full-duplex relay.

In some implementations, this invention is a system comprising: (a) a vehicle; and (b) a full-duplex analog relay; wherein (i) the full-duplex relay is housed in the vehicle, (ii) the vehicle is configured to move in a trajectory, and (iii) the full-duplex relay is configured to, at different times while the vehicle moves in the trajectory, relay signals from a first wireless transmitter, in such a way that spatial coordinates of the first wireless transmitter are inferable from the signals relayed by the full-duplex relay and from information about the trajectory. In some cases: (a) the system further comprises an optical tracking system, which optical tracking system includes one or more cameras and one or more computers; and (b) the optical tracking system is configured to track spatial position of the vehicle while the vehicle moves in the trajectory. In some cases: (a) the system includes a wireless tracking system that comprises (i) one or more other wireless transmitters, which one or more other transmitters do not include the first wireless transmitter, (ii) one or more wireless receivers, and (iii) one or more computers; (b) the full-duplex analog relay is configured to receive a set of signals from the one or other transmitters and to retransmit the set of signals to the one or more wireless receivers while the vehicle moves in the trajectory; (c) the one or more wireless receivers are configured to take measurements of the set of signals; and (d) the wireless tracking system is configured to track spatial position of the vehicle, based on the measurements taken by the one or more wireless receivers and based on information about spatial coordinates of the one or more other transmitters. In some cases: (a) the system includes a wireless tracking system that comprises (i) wireless receivers, and (ii) one or more computers; (b) the wireless receivers are configured to take measurements of the signals at the different times; and (c) the wireless tracking system is configured to track spatial position of the vehicle, based on the measurements taken by the wireless receivers and based on information about spatial coordinates of the wireless receivers. In some cases: (a) the system includes (i) a wireless receiver, and (ii) one or more computers; (b) the wireless receiver is configured to take measurements of the signals at the different times while the vehicle moves through a set of different positions in the trajectory; and (c) the one or more computers are programmed (i) to calculate a set of distances, by computing, for each of the different positions, respectively, a distance between the relay and the first wireless transmitter, and (ii) to calculate, based on the set of distances, spatial coordinates of the first wireless transmitter. In some cases, the one or more computers are programmed to estimate that a distance between the relay and the first wireless transmitter is equal to the shortest distance in a set of calculated distances, each calculated distance, respectively, corresponding to a different direct or indirect path taken by the signals. In some cases: (a) the system includes (i) a wireless receiver, and (ii) one or more computers; (b) the wireless receiver is configured to take measurements while the vehicle moves in the trajectory; and (c) the one or more computers are programmed to determine spatial coordinates of the first wireless transmitter, based on time, as measured in the measurements, at which the wireless receiver detects the signals from the first wireless transmitter. In some cases: (a) the system includes (i) a wireless receiver, and (ii) one or more computers; (b) the wireless receiver is configured to take measurements of the signals at the different times while the vehicle moves in the trajectory; and (c) the one or more computers are programmed to determine spatial coordinates of the first wireless transmitter, based on received signal strength of the signals, as measured in the measurements. Each of the cases described above in this paragraph is an example of the system described in the first sentence of this paragraph, and is also an example of an embodiment of this invention that may be combined with other embodiments of this invention.

In some implementations, this invention is a system comprising: (a) a vehicle; (b) a full-duplex analog relay; (c) a first transceiver; and (d) one or more computers; wherein (i) the full-duplex analog relay comprises (A) an analog uplink relay; and (B) an analog downlink relay, (ii) the downlink relay is configured to receive wireless downlink signals from the first transceiver and to transmit the downlink signals to a second transceiver, (iii) the uplink relay is configured to receive wireless uplink signals from the second transceiver and to transmit the uplink signals to the first transceiver, (iv) the downlink relay is configured to create a first phase offset in the downlink signals, (v) the uplink relay is configured to create a second phase offset in the uplink signals, the second phase offset being opposite in sign and substantially equal in magnitude to the first phase offset, (vi) the full-duplex analog relay is housed in the vehicle, (vii) the vehicle is configured to move in a trajectory, and (viii) the full-duplex analog relay is configured to, at different times while the vehicle moves in the trajectory, relay the uplink signals in such a way that spatial coordinates of the second transceiver are inferable from information about the trajectory and from phase of the uplink signals as received by the relay. In some cases, the full-duplex analog relay is configured to relay the downlink and uplink signals in such a way that, for a specific phase and a specific frequency of downlink signal received by the downlink relay, the downlink and uplink relay together create a net phase offset that is substantially constant, the net phase offset being equal to the absolute value of the difference between the first and second phase offsets. In some cases: (a) the first transceiver is configured to take measurements of the uplink signals at the different times while the vehicle moves through a set of different positions in the trajectory; and (b) the system includes one or more computers that are programmed (i) to calculate a set of distance measurements, by computing, for each of the different positions, respectively, phase of the uplink signals as received by the relay, and (ii) to calculate, based on the set of distance measurements, spatial coordinates of the second transceiver. In some cases: (a) the system further comprises an RFID reader, a first RFID tag and a second RFID tag; (b) the first transceiver is a component of the reader; (c) the second transceiver is a component of the first tag; (d) the first tag is configured to be wirelessly powered; and (e) the second tag and the relay are housed in the vehicle. In some cases, the system further comprises one or more computers that are programmed to perform a division in such a way that: (a) the division comprises dividing a numerator by a denominator to calculate a quotient; (b) the numerator is a signal from the first tag, as measured by the reader after being relayed by the relay; (c) the denominator is a signal that is measured by the reader and that is from the second tag which is housed with the relay in the vehicle; (d) the quotient is a signal that has a phase; and (e) the phase of the quotient depends on a first distance and does not depend on a second distance, the first distance being distance between the first tag and the full-duplex analog relay, and the second distance being distance between the full-duplex analog relay and the reader. In some cases: (a) the second transceiver comprises a backscatter node; (b) the system is configured in such a way that (i) the downlink signals have a first spectrum when transmitted by the downlink relay, and (ii) the uplink signals have a second spectrum when received by the uplink relay from the second transceiver, the second spectrum being different than the first spectrum; (c) the downlink relay includes an analog downlink filter; (d) the uplink relay includes an analog uplink filter; and (e) the uplink and downlink filters are configured to filter the uplink and downlink signals, respectively, in such a way as to attenuate a first leakage and a second leakage, the first leakage being leakage, to the uplink relay, of downlink signals transmitted by the downlink relay, and the second leakage being leakage, to the downlink relay, of uplink signals transmitted by the uplink relay. Each of the cases described above in this paragraph is an example of the system described in the first sentence of this paragraph, and is also an example of an embodiment of this invention that may be combined with other embodiments of this invention.

Each description herein of any method or apparatus of this invention describes a non-limiting example of this invention. This invention is not limited to those examples, and may be implemented in other ways.

Each description herein of any prototype of this invention describes a non-limiting example of this invention. This invention is not limited to those examples, and may be implemented in other ways.

Each description herein of any implementation, embodiment or case of this invention (or any use scenario for this invention) describes a non-limiting example of this invention. This invention is not limited to those examples, and may be implemented in other ways.

Each Figure that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

What is claimed:

1. A method comprising:
    (a) receiving wireless downlink signals from a transmitter and transmitting the downlink signals to a backscatter node, in such a way that (i) the receiving and transmitting of the downlink signals are performed by an analog downlink relay, and (ii) the downlink signals have a first spectrum when transmitted by the downlink relay;
    (b) receiving wireless uplink signals from the backscatter node and transmitting the uplink signals to the transmitter, in such a way that (i) the receiving and transmitting of the uplink signals are performed by an analog uplink relay and (ii) the uplink signals having a second spectrum when received by the uplink relay from the backscatter node, the second spectrum being different than the first spectrum;
   wherein
    (I) the downlink relay includes a first analog filter,
    (II) the uplink relay includes a second analog filter, and
    (III) the method further comprises filtering the downlink and uplink signals by the first and second filters, respectively, in such a way as to attenuate a first leakage and a second leakage, the first leakage being leakage, to the uplink relay, of downlink signals transmitted by the downlink relay, and the second leakage being leakage, to the downlink relay, of uplink signals transmitted by the uplink relay.

2. The method of claim 1, wherein the method further comprises:
    (a) the downlink relay (i) downconverting the downlink signals, lowpass filtering the downlink signals in baseband, and upconverting the downlink signals, or (ii) shifting frequency of the downlink signals and bandpass filtering the downlink signals; and
    (b) the uplink relay (i) downconverting the uplink signals, bandpass filtering the uplink signals in baseband, and upconverting the uplink signals, or (ii) shifting frequency of the uplink signals and bandpass filtering the uplink signals.

3. The method of claim 1, wherein:
    (a) the downlink signal is received by the downlink relay at a first frequency and is transmitted by the downlink relay at a second frequency; and
    (b) the uplink signal is received by the uplink relay at the second frequency and is transmitted by the uplink relay at the first frequency.

4. The method of claim 1, wherein the method further includes:
    (a) creating, with the downlink relay, a first phase offset in the downlink signals;
    (b) creating, with the uplink relay, a second phase offset in the uplink signals, which second phase offset is opposite in sign and substantially equal in magnitude to the first phase offset.

5. The method of claim 1, wherein, for a specific phase and a specific frequency of downlink signal received by the downlink relay, the downlink and uplink relays together create a net phase offset that is substantially constant, the net phase offset being equal to the absolute value of the difference between the first and second phase offsets.

6. A method comprising:
    (a) receiving wireless downlink signals and retransmitting the downlink signals; and
    (b) receiving wireless uplink signals and retransmitting the uplink signals;
   wherein the receiving and retransmitting of downlink signals and the receiving and retransmitting of uplink signals are performed by a set of two of more full-duplex analog relays, in such a way that
    (i) in each specific full-duplex relay in the set
        (A) an analog downlink relay of the specific full-duplex relay retransmits the downlink signals at a first peak frequency, which first peak frequency is different than that at which all other downlink relays in the set retransmit, and
        (B) an analog uplink relay of the specific full-duplex relay retransmits the uplink signals at a second peak frequency, which second peak frequency is different than that at which all other uplink relays in the set retransmit,
        (C) the downlink signals have a first spectrum when transmitted by the downlink relay of the specific full-duplex relay and have a second spectrum when received by the uplink relay of the specific full-duplex relay, which second spectrum is different than the first spectrum, and
        (D) the uplink and downlink signals are filtered by a first analog filter and a second analog filter, respectively, of the specific full-duplex relay, in such a way as to attenuate a first leakage and a second leakage, the first leakage being leakage, to the uplink relay of the specific full-duplex relay, of downlink signals transmitted by the downlink relay of the specific full-duplex relay, and the second leakage being leakage, to the downlink relay of the specific full-duplex relay, of uplink signals transmitted by the uplink relay of the specific full-duplex relay,
    (ii) a first full-duplex analog relay in the set receives the downlink signals from a first transmitter,
    (iii) a second full-duplex analog relay in the set retransmits the downlink signals to a backscatter node,
    (iv) the second full-duplex relay receives the uplink signals from the backscatter node, and
    (v) the first second full-duplex relay transmits the uplink signals to the first transmitter.

7. A method comprising:
    (a) receiving wireless downlink signals from a first transceiver and transmitting the downlink signals to a second transceiver, the receiving and transmitting of the downlink signals being performed by an analog downlink relay in such a way as to create a first phase offset in the downlink signals; and
    (b) receiving wireless uplink signals from the second transceiver and transmitting the uplink signals to the first transceiver, the receiving and transmitting of the uplink signals being performed by an analog uplink relay in such a way as to create a second phase offset, which second phase offset is opposite in sign and substantially equal in magnitude to the first phase offset;
   wherein
    (i) a full-duplex analog relay includes the downlink relay and the uplink relay and is housed in a vehicle, and
    (ii) the method further comprises, at different times while the vehicle moves in a trajectory, relaying the uplink signals in such a way that spatial coordinates of the second transceiver are inferable from information about the trajectory and from phase of the uplink signals as received by the full-duplex relay.

8. The method of claim 7, wherein the downlink and uplink signals are relayed by the full-duplex relay in such a way that, for a specific phase and a specific frequency of downlink signal received by the downlink relay, the downlink and uplink relay together create a net phase offset that is substantially constant, the net phase offset being equal to the absolute value of the difference between the first and second phase offsets.

9. The method of claim 7, wherein the method also includes:
   (a) taking measurements of the uplink signals at the different times while the vehicle moves through different positions in the trajectory, the taking measurements being performed by the first transceiver;
   (b) calculating a set of distance measurements, by computing, for each of the different positions, phase of the uplink signals as received by the full-duplex relay; and
   (c) calculating, based on the set of distance measurements, spatial coordinates of the second transceiver.

10. The method of claim 7, wherein:
    (a) the first transceiver is a component of an RFID reader;
    (b) the second transceiver is a component of a first RFID tag;
    (c) the first RIFD tag is wirelessly powered; and
    (d) the full-duplex relay and a second RFID tag are housed in the vehicle.

11. The method of claim 10, wherein the method further comprises calculating a division in such a way that:
    (a) the division comprises dividing a numerator by a denominator to calculate a quotient;
    (b) the numerator is a signal from the first tag, as measured by the reader after being relayed by the relay;
    (c) the denominator is a signal that is measured by the reader and that is from the second tag which is housed with the relay in the vehicle;
    (d) the quotient is a signal that has a phase; and
    (e) the phase of the quotient depends on a first distance and does not depend on a second distance, the first distance being distance between the first tag and the full-duplex analog relay, and the second distance being distance between the full-duplex analog relay and the reader.

12. The method of claim 7, wherein:
    (a) the second transceiver comprises a backscatter node;
    (b) the downlink signals have a first spectrum when transmitted by the downlink relay;
    (c) the uplink signals have a second spectrum when received by the uplink relay from the second transceiver, the second spectrum being different than the first spectrum;
    (d) the downlink relay includes a first analog filter;
    (e) the uplink relay includes a second analog filter; and
    (f) the method further comprises filtering the downlink and uplink signals by the first and second filters, respectively, in such a way as to attenuate a first leakage and a second leakage, the first leakage being leakage, to the uplink relay, of downlink signals transmitted by the downlink relay, and the second leakage being leakage, to the downlink relay, of uplink signals transmitted by the uplink relay.

* * * * *